(12) United States Patent
Freudinger

(10) Patent No.: US 8,925,596 B2
(45) Date of Patent: Jan. 6, 2015

(54) DISPENSING APPARATUS

(76) Inventor: Mark J. Freudinger, Peotone, IL (US)

( * ) Notice: Subject to any disclaimer, the term of this patent is extended or adjusted under 35 U.S.C. 154(b) by 845 days.

(21) Appl. No.: 12/932,769

(22) Filed: Mar. 7, 2011

(65) Prior Publication Data

US 2012/0227865 A1 Sep. 13, 2012

(51) Int. Cl.
B65B 43/42 (2006.01)
A21C 9/04 (2006.01)

(52) U.S. Cl.
CPC .......................................... A21C 9/04 (2013.01)
USPC ........... 141/145; 141/129; 141/131; 141/144; 99/494

(58) Field of Classification Search
USPC ........ 141/83, 129–176; 99/450.1, 450.7, 494; 53/472, 473
See application file for complete search history.

(56) References Cited

U.S. PATENT DOCUMENTS

| | | | | |
|---|---|---|---|---|
| 2,753,099 A | * | 7/1956 | Jenner et al. ..................... | 177/52 |
| 2,755,007 A | * | 7/1956 | Knobel ............................ | 141/78 |
| 3,045,720 A | * | 7/1962 | Jungmayr et al. ............ | 141/145 |
| 3,368,501 A | | 2/1968 | Kuhlman | |
| 3,578,040 A | * | 5/1971 | Galloway ...................... | 141/142 |
| 3,621,981 A | * | 11/1971 | Nimmo et al. ............. | 198/419.2 |
| 3,662,677 A | | 5/1972 | Westling | |
| 3,780,643 A | | 12/1973 | Papai | |
| 3,905,326 A | | 9/1975 | Eisenberg | |
| 3,908,584 A | | 9/1975 | Raque | |
| 4,145,990 A | | 3/1979 | Hochandel et al. | |
| 4,152,976 A | * | 5/1979 | Kawasaki et al. ............ | 99/450.1 |
| 4,850,259 A | * | 7/1989 | Morris ............................... | 86/31 |
| 4,899,790 A | * | 2/1990 | Odenthal ...................... | 141/134 |
| 5,121,677 A | | 6/1992 | LeClaire et al. | |
| 5,458,055 A | | 10/1995 | Fitch, Jr. | |
| 5,523,101 A | * | 6/1996 | Fitch, Jr. ....................... | 426/289 |
| 5,605,183 A | * | 2/1997 | Hartman et al. ............. | 141/237 |
| 5,678,476 A | | 10/1997 | Sanders | |
| 5,865,107 A | * | 2/1999 | Sanguinetti et al. ......... | 99/450.6 |
| 6,051,070 A | | 4/2000 | Sunter | |
| 6,119,440 A | * | 9/2000 | Benner et al. .................. | 53/473 |
| 6,598,519 B1 | | 7/2003 | Thomas et al. | |
| 6,625,961 B1 | * | 9/2003 | Ogier et al. ..................... | 53/502 |
| RE38,478 E | | 3/2004 | Fitch, Jr. et al. | |
| 6,711,877 B2 | | 3/2004 | Zschoche | |
| 8,708,002 B2 | * | 4/2014 | Malenke et al. .................. | 141/2 |
| 2012/0067451 A1 | * | 3/2012 | Malenke et al. .................. | 141/1 |

* cited by examiner

Primary Examiner — Timothy L Maust
(74) Attorney, Agent, or Firm — Joseph Golant

(57) ABSTRACT

A dispensing apparatus including an adjustable intake conveyor assembly, two receiving conveyor assemblies to receive product from the intake conveyor assembly, two rake assemblies for metering the product on the receiving conveyor assemblies, two upper funnels at downstream ends of the receiving conveyor assemblies for containing and redirecting product, two funnel groups to pass product falling from the upper funnels to targets moving below the funnel groups. Each funnel group includes a plurality of dispensing funnels, and each dispensing funnel is connected to adjacent dispensing funnels and moves along a racetrack shaped rail in synchronization with the moving targets below the dispensing funnels. A guide pan lowers and raises the dispensing funnels toward and away from the targets for precise deposits.

21 Claims, 30 Drawing Sheets

DISPENSING APPARATUS

FIELD OF THE INVENTION

The present invention relates to a dispensing apparatus, and, more particularly, to a dispensing apparatus that may be used for topping or filling a moving target or substrate with a precise and controlled deposit of a product.

BACKGROUND OF THE INVENTION

Food product topping or filling machines are well known and are disclosed in a number of earlier patents. By way of examples, Kuhlman patented a distributing device in 1968, U.S. Pat. No. 3,368,501, for a "Food Distribution Apparatus" that purports to disclose a pizza making machine in which a block of cheese is first shredded and the shredded cheese is lifted by a slanted conveyor to a second, lateral conveyor. The cheese drops to a third conveyor where the cheese is deposited in heaps. The heaped cheese is then raked to cause a more even distribution, and the cheese is beaten to result in a more uniform thickness. Thereafter, the raked and beaten cheese falls from the third conveyor onto pizza bases moving on a fourth, lower horizontal conveyor. Excess cheese is captured and returned to the slanted lift conveyor. It is noted that over the years, pizza dough moving on a conveyor has been referred to as bases, targets, substrates and shells. Four years after the Kuhlman patent, a patent issued to Westling, U.S. Pat. No. 3,662,677, for a "Machine For Shredding Cheese And For Depositing The Cheese Onto Pizzas" and purports to disclose a machine for depositing cheese including a cutter for shredding a cheese block. Falling shredded cheese is directed by a swinging baffle to initially land to the rear of a pizza base. As the baffle swings upward the shredded cheese is directed to the center and then the forward portions of the pizza base. A paddle is used to deflect falling cheese to the baffle.

In 1973, U.S. Pat. No. 3,780,643 issued to Papai and purports to disclose a pizza-making machine where pizza bases or shells move along incrementally on a conveyor, stopping at a tomato paste depositing station, a grated cheese depositing station and a sliced sausage depositing station. Tomato paste, grated cheese and sliced sausage are deposited on the pizza shells at each station by gravity. In 1975, U.S. Pat. No. 3,905,326 issued to Eisenberg for a "Product Spreading Machine and Method" and purports to disclose a machine for spreading or shaking topping products on food items such as pizza shells. A conveyor transports pizza shells through a drum and passed a row of air nozzles where the air nozzles blow a topping, such as shredded cheese, off rake tines connected to the drum and onto a shaker tray. The shaker tray progressively moves the shredded cheese until it cascades over a diagonal edge and onto passing pizza shells. Excess cheese is blown or scrapped off the conveyor and collected. A couple of weeks later in 1975, a patent issued to Raque, U.S. Pat. No. 3,908,584 for a "Pizza Topping Machine." The patent purports to disclose a pizza topping system where pizza shells pass a tomato paste station, and then the shells speed more quickly on another conveyor before momentarily stopping at two other stations, one for the deposit of ground meat and the other for the deposit of grated cheese. Tomato paste passes through a valve consisting of a cylindrical rotor with grooves rotating in a tubular outer shell. The ground meat and grated cheese are dispensed from individual hoppers, each hopper having an agitator unit.

In 1979, Hochandel and Meyer were issued a patent, U.S. Pat. No. 4,145,990, for an "Apparatus for Applying Grated Cheese to Pizza Shells" and the patent purports to disclose yet another device for the automatic application of grated cheese to passing pizza shells moving on a conveyor under the device. The cheese is grated and deposited onto a transfer conveyor that is stationary during grating, then driven in timed relationship to the pizza shells moving on the lower conveyor. The cheese falls onto the pizza shells in a preselected pattern, frequently called a "waterfall." Later in 1979, U.S. Pat. No. 4,152,976 issued to Kawasaki and others for an "Automatic Weighing and Distributing Apparatus for Topping Sliced Cheese Etc. on Pie Crusts." The apparatus is another device for depositing grated cheese on passing pizza shells. Each shell stops under a casing having a configuration slightly smaller than the pizza shell and a weighted amounted of grated cheese is dropped through the casing onto each shell. The casing includes a bucket for weighing the cheese and stirrer blades that uniformly spreads the cheese as the cheese falls past.

In 1992, U.S. Pat. No. 5,121,677 issued to Claire and others for a "Pizza Making and Baking Machine" and purports to disclose a device for pizza making having a conveyor for pizza shells and multiple stations for depositing various toppings. The pizza shell conveyor moves, stepwise, along to each station, and a computer controls whether a station deposits an ingredient according to a computer program. U.S. Pat. No. 5,458,055 issued to Fitch Jr., in 1995 for a "Method and Apparatus for Portioning Food." The patent purports to disclose that pizza shells move by a conveyor to cylindrically shaped dispensing hoppers. Each hopper stores food to be deposited and is able to rotate about a central axis in a circular manner above the pizza shell conveyor. Where the pizza shell conveyor passes beneath a hopper, the conveyor is specially configured in a semi-circle to match a portion of the cross section of the cylindrical geometry of the hopper. This arrangement allows the hopper to be synchronized to move above each pizza shell for a time so that the food product stored in the hopper is deposited onto the pizza shell.

In 1997, U.S. Pat. No. 5,678,476 issued to Sauders for an "Apparatus for the Uniform Distribution of a Food Product Over a Surface." The Sauders' patent purports to disclose a food spreader for spreading cheese onto a pizza crust in an even manner, the pizza crust being positioned under the spreader. The spreader includes a cylindrical housing with hand-cranked paddles that move the cheese through a porous bottom plate. In 2000, a patent issued to Sunter, U.S. Pat. No. 6,051,070, for an "Apparatus for Applying Materials to Substrates" which purports to disclose another device for applying a food product on a substrate, such as a pizza shell. The device includes upper and lower shutter assemblies that open quickly to allow product, such as cheese, to fall a predetermined height from the upper shutter, and thereby determine the spread of the product, before the lower assembly opens to deposit the product on the substrate. U.S. Pat. No. 6,598,519 issued to Thomas and Wharton in 2003 for a "Particulate Distributor" purports to disclose a device to distribute food, such as grated or shredded cheese, vegetables or meats, over a discrete region of a moving pizza substrate. The device weighs product to be distributed and directs the product to one of two buckets. The buckets store the product until it is time to drop the product into a distributor, an upper conveyor that moves at the same velocity as a conveyor with the pizza shells.

In 2004, U.S. Pat. No. RE38,478 reissued for an "Apparatus for Dispensing a Quantity of Material on a Shell" and purports to disclose a device for dispensing food material on a target food, such as pizza shells, moving on a stop and go conveyor belt where the food material is dropped from a hopper through a mask, passing a stirring and distribution unit unto the target. In a preferred embodiment, the patent discloses that the food from the hopper drops to a short transfer conveyor that stops under the hopper to receive a load, and then the transfer conveyor moves in a synchronized fashion with the pizza shell conveyor. Food material on the transfer conveyor then falls onto the target when the food reaches the end of the transfer conveyor.

Also issuing in 2004, a patent was granted to Zschoche, U.S. Pat. No. 6,711,877, for a "Food Product Handling Machine." The patent purports to disclose a product-handling machine in which a transfer machine moves a plurality of independently moveable transfer pockets having open tops and bottoms along a conveyor between a portioning machine and a container handling machine. In one embodiment the conveyor supports the food in the pockets but moves independently of the pockets so that the pockets may be stopped to receive food, and again, to discharge food. In another embodiment, it is disclosed that the transfer pockets and the container-handling machine may move in alignment so as to allow continuous movement. In yet another embodiment, each transfer pockets is supported by a guide plate from the food-portioning machine to a container conveyor. Product placed in the transfer pocket by the food portioning machine is retained by the guide plate which supports the transfer pocket as it travels on the guide plate, with the guide plate acting as a bottom for the transfer pocket. The guide plate moves to a slide plate location where the transfer pocket is positioned over an empty container. When the transfer pocket containing the food portion has been advanced to the slide plate location above the container-handling machine, the slide plate moves laterally resulting in an opening under the transfer pocket to enable the food portion in the transfer pocket to drop into the food container.

These patents and the devices disclosed are of some interest, however, they do not disclose or illustrate an advantageous dispensing apparatus.

SUMMARY OF THE INVENTION

The present inventive dispensing apparatus includes a number of features and advantages. The dispensing apparatus is compact, includes a movable base, and is also adjustable vertically to enable a retrofit to an existing target transporting conveyor system. The dispensing apparatus is safe, easy to clean and maintain, and of robust construction. The apparatus has several adjustment mechanisms providing apparatus flexibility and close control of the product to be dispensed. Furthermore, the apparatus includes a racetrack configured funnel group provide long overlay time of the funnels over the targets and for precise deposit of product onto or into the target to insure that target peripheries are free of deposited product.

Briefly summarized, the invention relates to a dispensing apparatus including a base, a head assembly adjustably mounted to the base and structured to accommodate a linear portion of a conveyor system transporting targets for receiving product dispensed from the head assembly, the head assembly including a receiving conveyor assembly for transporting product to be dispensed, an adjustable rake assembly for leveling the product to be dispensed on the receiving conveyor assembly, and a racetrack configured funnel group mounted below the receiving conveyor assembly, and the funnel group including a plurality of dispensing funnels having open tops and bottoms wherein the dispensing funnels are able to move linearly above and in synchronization with targets on the linear portion of the target transporting conveyor system.

The invention also relates to a method for making a dispensing apparatus, the steps of the method including mounting an adjustable receiving conveyor assembly to a frame, connecting a rake assembly to the frame above the rake conveyor assembly, connecting an upper funnel to the frame at a downstream end of the rake conveyor assembly to pass falling raked product to be dispensed, connecting a plurality of dispensing funnels to the frame below the upper funnel and arranging the plurality of dispensing funnels to move along a racetrack configuration wherein a linear portion of the racetrack configuration is located to enable the dispensing funnels to move above a linear portion of a conveyor system transporting targets to receive product to be dispensed, and connecting controls to the dispensing funnels to enable movement of the plurality of dispensing funnels in synchronization with movement of the targets on the target transporting conveyor system.

A complete understanding of the present invention, along with objects, advantages, and features thereof, will be gained from a consideration of the present specification which provides a written description of the invention, and of the manner and process of making and using the invention, set forth in such full, clear, concise and exact terms as to enable any person skilled in the art to which it pertains, or with which it is most nearly connected, to make and use the same in compliance with Title 35, U.S.C. §112 (first paragraph). Furthermore, the following description of the preferred embodiment of the invention read in conjunction with the accompanying drawings provided herein represents an example of the invention, however, the invention itself is defined in the Claims section attached hereto.

BRIEF DESCRIPTION OF THE DRAWINGS

FIG. 1 is presented to facilitate a better understanding of the invention.

DESCRIPTION OF THE PREFERRED EMBODIMENT

Figure 1:
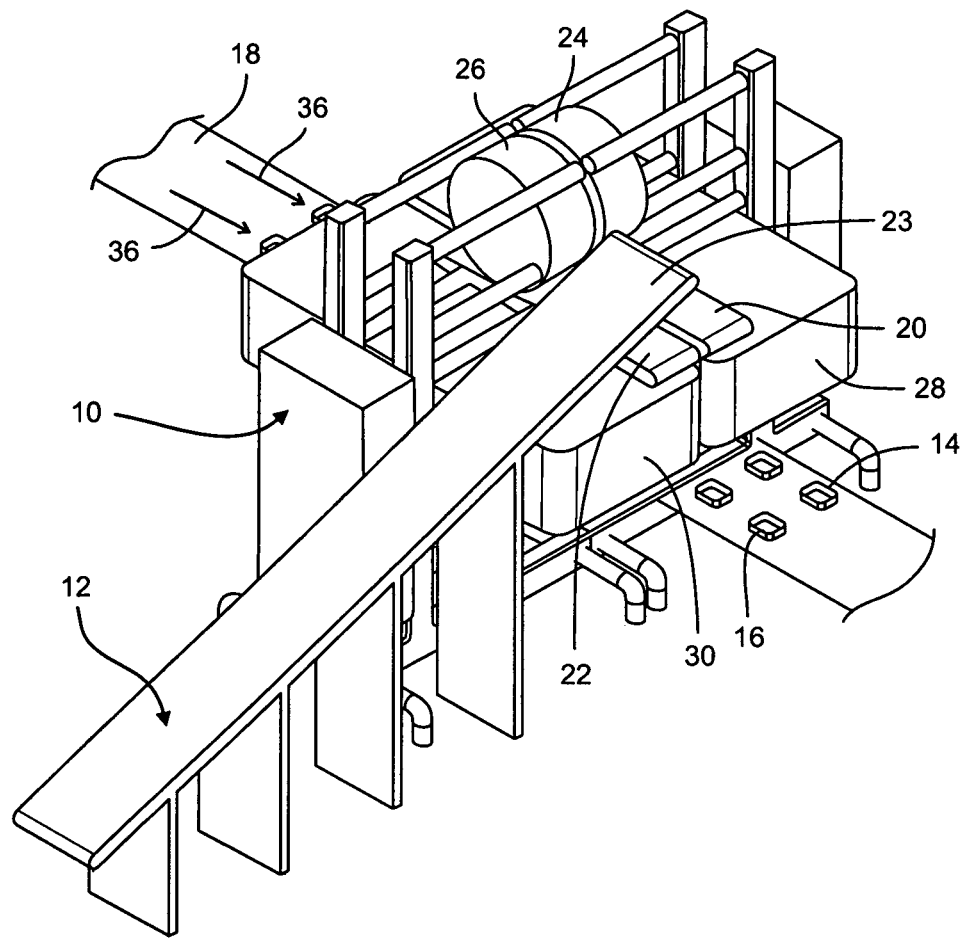
FIG. 1 is a simplified and abridged isometric view of a dispensing apparatus, and includes related structures, such as a delivery conveyor assembly and a target conveyor system.
Figure 2:
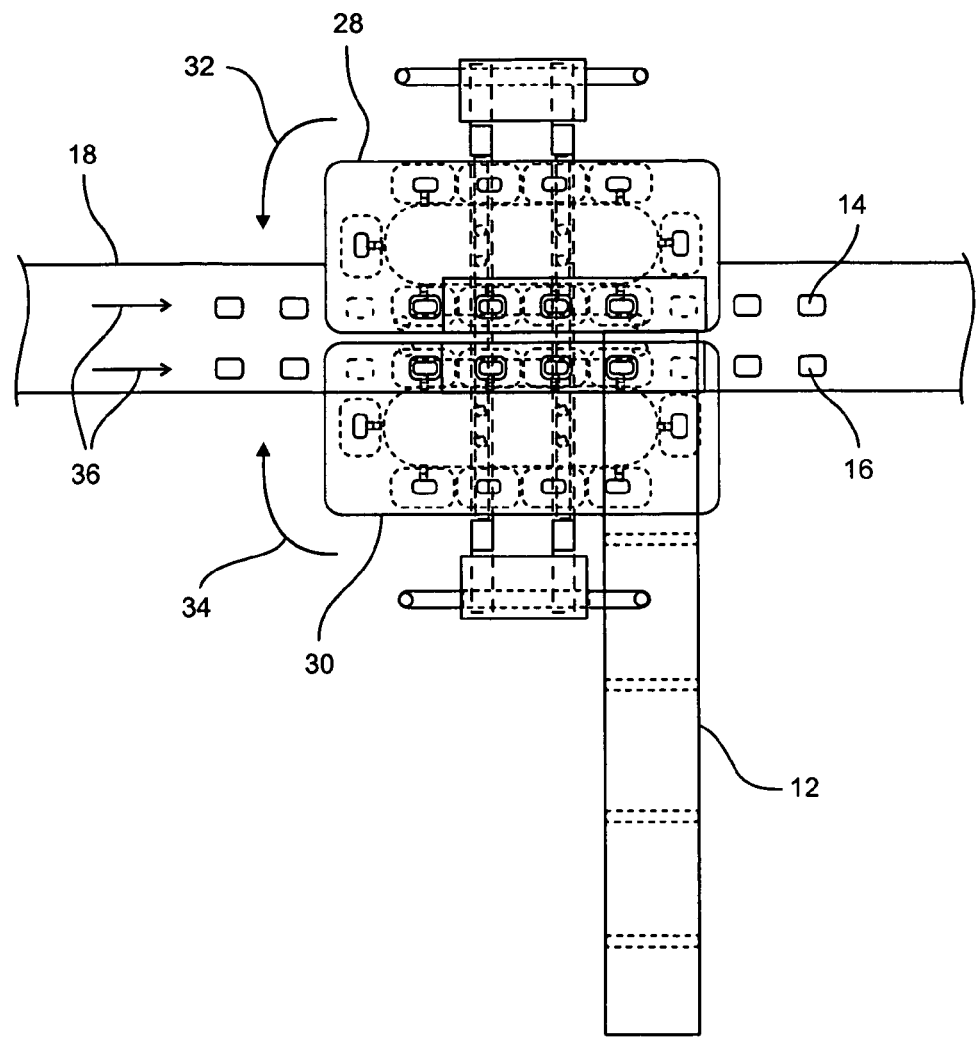
FIG. 2 is a simplified and abridged plan view of a portion of the dispensing apparatus and related structure shown in FIG. 1.
Figure 3:
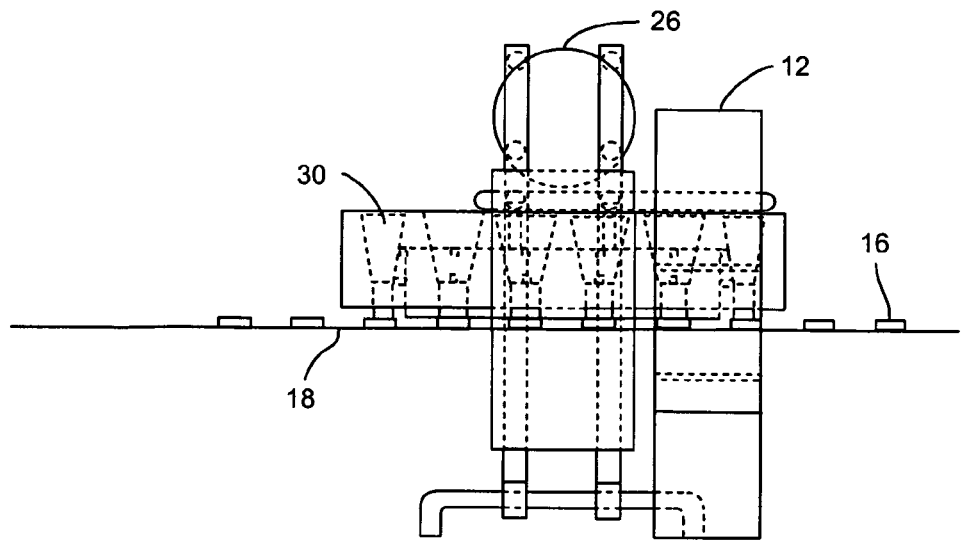
FIG. 3 is a simplified and abridged elevation view of the dispensing apparatus and related structure shown in FIG. 1.
Figure 4:
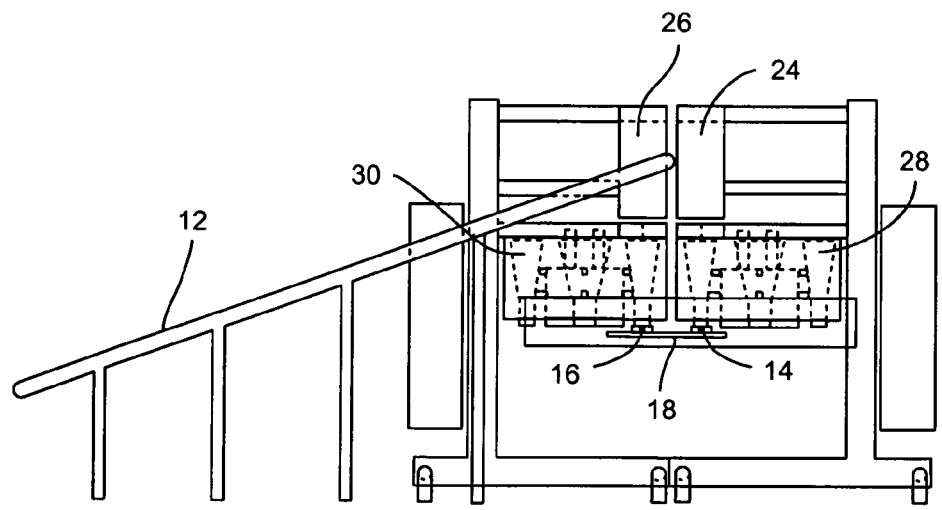
FIG. 4 is another simplified and abridged elevation view of the dispensing apparatus and related structure shown in FIGS. 1 and 3.
Figure 5:
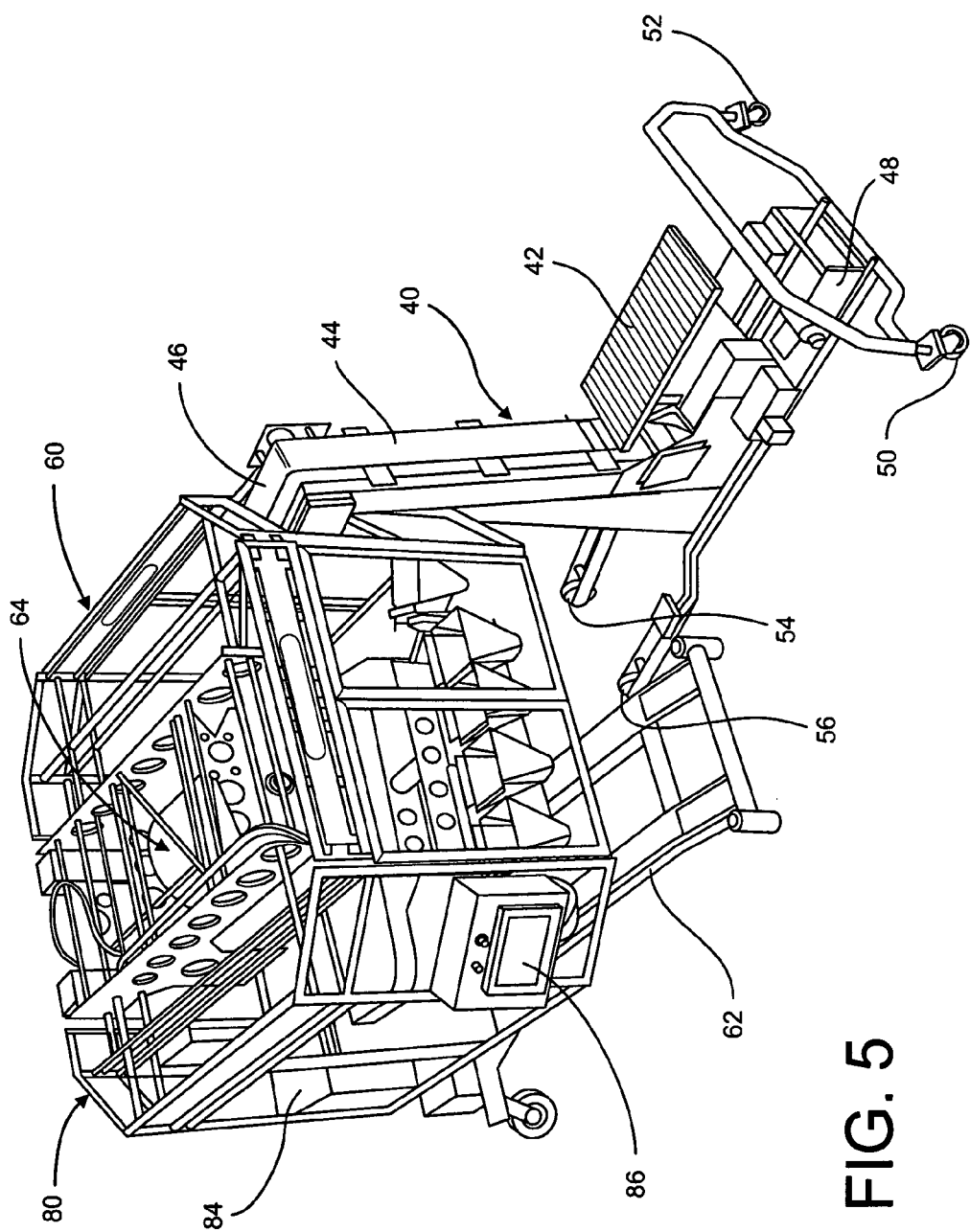
FIG. 5 is a generalized isometric view of a preferred embodiment of a dispensing apparatus of the present invention, along with a product delivery conveyor assembly.
Figure 6:
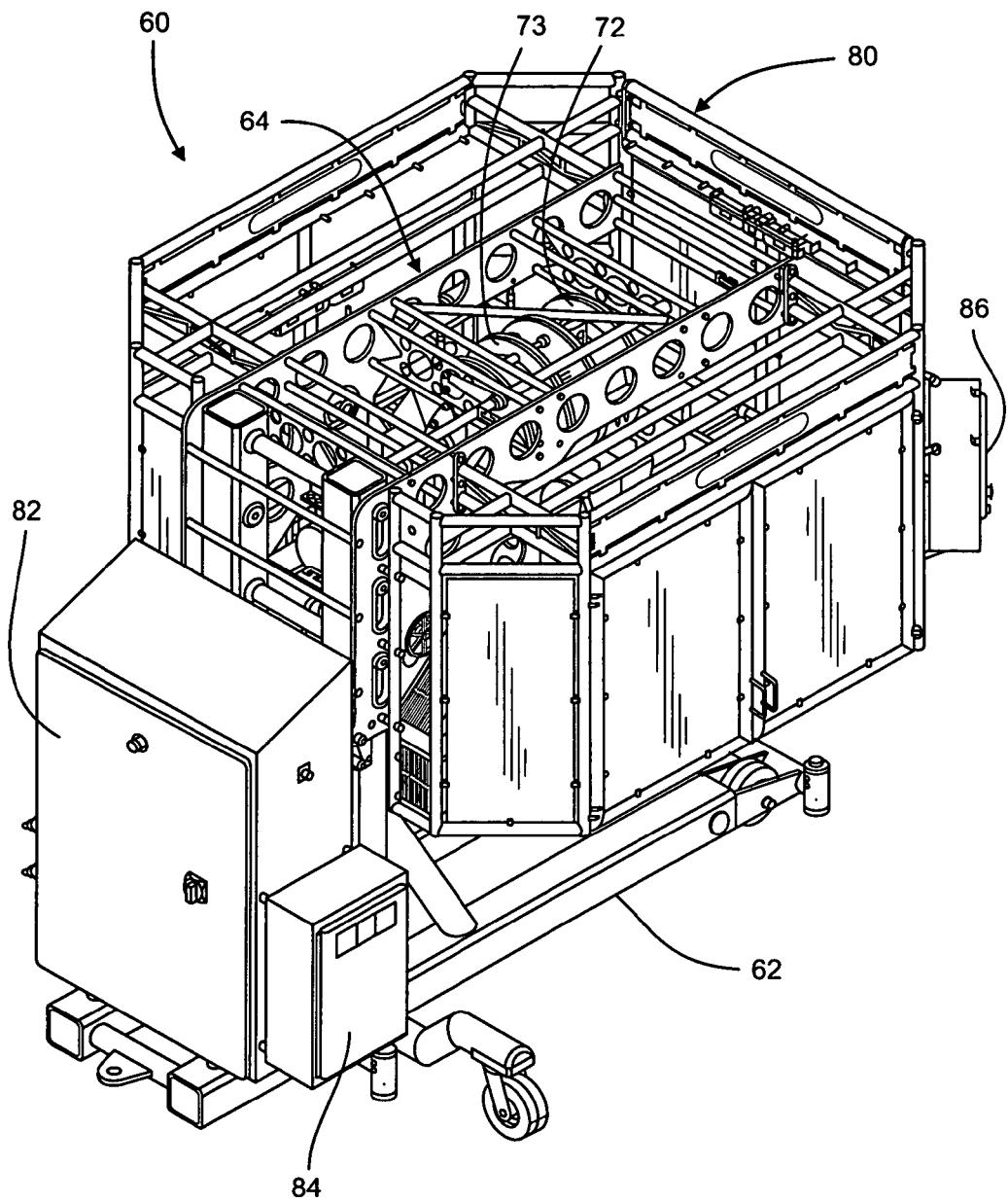
FIG. 6 is a downward looking, slightly enlarged and more detailed isometric view of the dispensing apparatus shown in FIG. 5.
Figure 7:
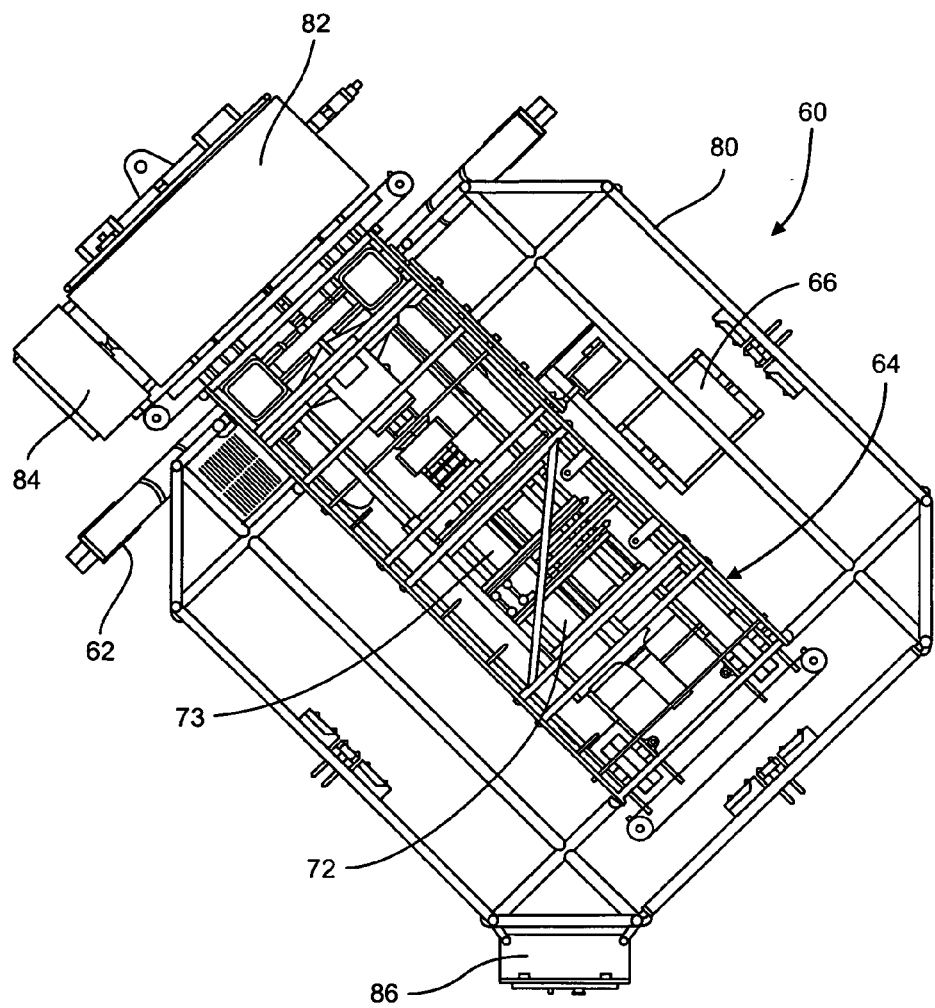
FIG. 7 is a plan view of a portion of the dispensing apparatus shown in FIG. 6.

While the present invention is open to various modifications and alternative constructions, the preferred embodiment illustrating the best mode contemplated by the inventors of carrying out their invention is shown in the various drawings and will be described herein in detail, pursuant to Title 35 U.S.C. §112 (first paragraph). It is noted, however, that there is no intention to limit the invention to the particular embodiment disclosed herein. To the contrary, the intention is to cover and claim all modifications, equivalent structures and methods, and alternative constructions falling within the spirit and scope of the invention as expressed in the appended Claims section attached hereto, pursuant to Title 35 U.S.C. §112 (second paragraph).

Referring first to FIGS. 1-4, there is illustrated in simplified and abridged form a dispensing apparatus 10 as an introduction to the dispensing apparatus of the present invention more fully illustrated and described in relation to FIGS. 5-44. The simplified introductory description provided here will help orientate readers to the much more detailed and complete description of the preferred embodiment of the present invention that follows below.

A product delivery conveyor assembly 12 is located adjacent to the dispensing apparatus 10, and may be used to bring product to be dispensed or deposited on or in target substrates 14, 16 moving passed the dispensing apparatus 10 on what may be considered a portion of a typical target conveyor system 18. In the drawings, two lines of target substrates are illustrated moving in parallel alignment. Although containers are shown, pizza crusts or other "targets" may be transported by the conveyor system. An intake conveyor (not shown) mounted below an upper end 23 of the product delivery conveyor 12 receives product to be dispensed. The intake conveyor then deposits the product on two receiving conveyors 20, 22. The receiving conveyors 20, 22 move the product to be dispensed past two rake assemblies 24, 26 to meter the dispensing product. The raked product is then dropped through upper funnels (not shown) to two groups of dispensing funnels 28, 30, each of the funnel groups for moving above a respective line of target substrates.

The funnel groups 28, 30 are made to move in synchronization with the target substrates 14, 16 to allow dispensing product falling through the dispensing funnels to be precisely placed on or in the target substrates. Each funnel group 28, 30 is mounted to move in a "racetrack", or sometimes called a "stadium", configuration, as shown clearly in FIG. 2, such that each dispensing funnel in each funnel group moves for a considerable linear distance parallel to a linear portion of the target conveyor system 18 immediately above a target substrate to allow plenty of time for all of the dispensing product passing through a dispensing funnel to drop onto or into an aligned target substrate. In the drawings, the funnel group 28 moves in a counterclockwise direction as symbolized by a curved arrow 32 and the funnel group 30 moves in a clockwise direction as symbolized by a curved arrow 34. The target conveyor system 18 moves in the direction symbolized by arrows 36. It is also noted that the term "substrate" includes any item to be topped or filled, such as a pizza shell or crust, a fruit pie, a frozen food container or an electronic assembly, for example.

A primary object of the dispensing apparatus of the present invention is to deposit product, such as a food product, precisely onto or into a target substrate, that is, without any of the deposited product landing on the periphery of the substrate. In the case where the substrate is pizza, it is usually desired that a completed pizza have a peripheral crust without any topping. In the case where the substrate is a container for frozen food, each container must be completely sealed about its periphery to allow successful freezing. Any product remaining on a container periphery will defeat a complete seal, thereby resulting in a defective item. When the product is food, an incomplete seal around a frozen food package may present a health hazard.

Unlike the simplified and abridged dispensing apparatus 10 shown in FIGS. 1-4, a preferred embodiment of the present invention along with an accessory item is illustrated and described in relation to FIGS. 5-44. The accessory item, a product delivery conveyor assembly 40 shown in FIG. 5, includes a product hopper 42, a lifting conveyor portion 44 and a lateral conveyor portion 46, all mounted on a moveable dolly 48. The dolly includes a set of wheels 50, 52, 54, 56 that allows the product delivery conveyor 40 to be easily positioned adjacent a dispensing apparatus 60 that may be retrofitted to an existing target conveyor system. In the alternative, product to be deposited may be delivered to the dispensing apparatus 60 by a fixed conveyor system or from a hopper or other well-known delivery system.

Figure 8:
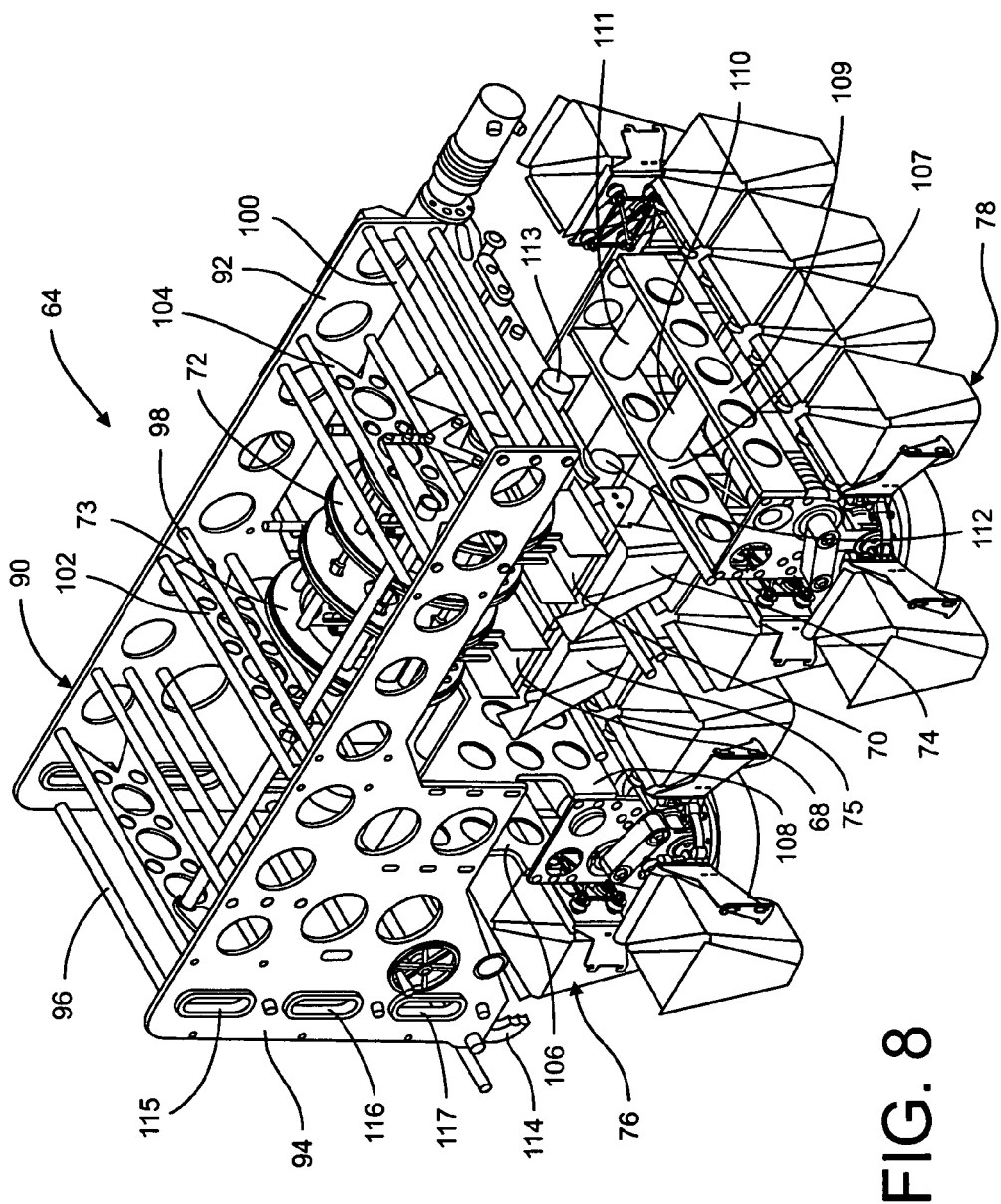
FIG. 8 is an enlarged downward looking isometric view of a head assembly of the dispensing apparatus illustrated in FIGS. 5-7.
Figure 9:
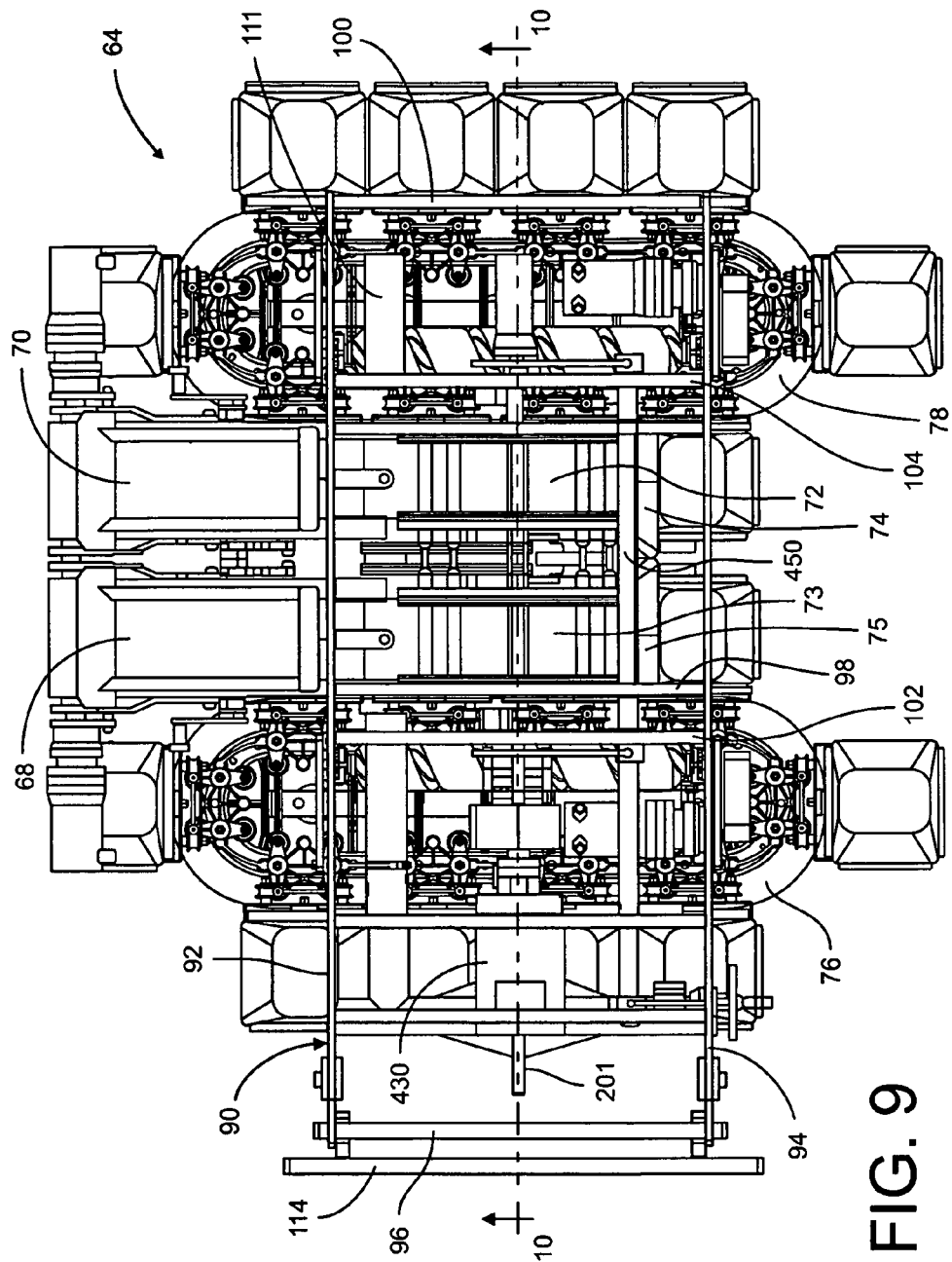
FIG. 9 is a plan view of the head assembly illustrated in FIG. 8.

The dispensing apparatus 60 is a preferred embodiment of the present invention and includes a moveable stand or base 62 for supporting, moving, and adjusting a head assembly 64. The head assembly 64, FIGS. 5-10, includes an adjustable intake conveyor assembly 66, FIG. 7, mounted below the lateral portion 46 of the product delivery conveyor 40. Two adjustable product receiving conveyor assemblies 68, 70, best seen in FIGS. 8 and 9, are located below a downstream discharge end of the intake conveyor assembly 66. The receiving conveyor assemblies 68, 70 move the product to be dispensed past two rake assemblies 72, 73 to help meter the dispensing product which is then propelled through two upper funnels 74, 75 for containment and redirection to two funnel groups 76, 78. The funnel groups 76, 78 are enabled to move in synchronization with target substrates to ensure that dispensing product falling through the funnel groups 76, 78 is precisely placed on or in the target substrates. The dispensing apparatus 60 also includes a safety enclosure 80, an electrical/electronics cabinet 82, a hydraulic pump system cabinet 84, and an operator control panel 86. In the alternative, it is understood that only one receiving conveyor assembly, one rake assembly, and one funnel group may be used for a single substrate line. Also, multiple (more than two) receiving conveyor assemblies, rake assemblies, and funnel groups may be used if more than two substrate lines are to be topped or filled or more than one topping or filling is being handled. In this regard, it is noted that the dispensing apparatus shown in FIGS. 5-44, is in the form of a single cantilevered unit that may be positioned over the entire width of the target conveyor system. In the alternative, the dispensing apparatus may be divided into two smaller cantilevered units where each of the smaller units may be positioned over only one-half of the width of the target conveyor system as shown in FIGS. 1-4. Or, the units may be staggered on each side of a target conveyor system as a function of available space, for example. These versions and others illustrate the flexibility of the present invention.

The electrical/electronics cabinet 82 may contain various electrical and electronic components to control the dispensing apparatus, such components being well known to those skilled in the relevant art. The pump system cabinet 84 may contain, among other things, a pump and a hydraulic reservoir to facilitate vertical movement of the head assembly relative to the base and is also well known to those skilled in the relevant art. The operator control panel 86 enables convenient access for operating the dispensing apparatus as is also well known by those skilled in the relevant art.

Referring now to FIGS. 8-11, the head assembly 64 includes a frame 90 that is adjustably mounted to the base 62 to enable the head assembly to move vertically relative to the base. The intake conveyor assembly 66, FIG. 7, the receiving conveyor assemblies 68, 70, the rake assemblies 72, 73, the upper funnels 74, 75, and the funnel groups 76, 78 are all mounted to the frame 90 in a very compact package which aids movement and retrofitting of the dispensing apparatus 60. The frame 90 includes two side plates 92, 94, a number of lateral connecting bars, such as the bars 96, 98, 100, rake end support assemblies 102, 104, lateral support panels 106, 107, 108, 109, lower longitudinally extending mounting tubes 110, 111, upper mounting tubes 112, 113, and a pivotal ratchet pawl 114. Each side plate includes three openings, such as the openings 115, 116, 117 of the side plate 94. Surrounding the frame 90 on three sides and a portion of a fourth side is the safety enclosure 80, FIGS. 6 and 7. The electrical/electronics cabinet 82 is mounted to the base 62 at the fourth side of the safety enclosure, and the hydraulics cabinet 84 is mounted to the electrical/electronics cabinet 82, such that the electrical/electronics cabinet 82 completes a safety barrier, along with the safety enclosure 80, around the operating mechanisms of the dispensing apparatus 60.

Figure 12:
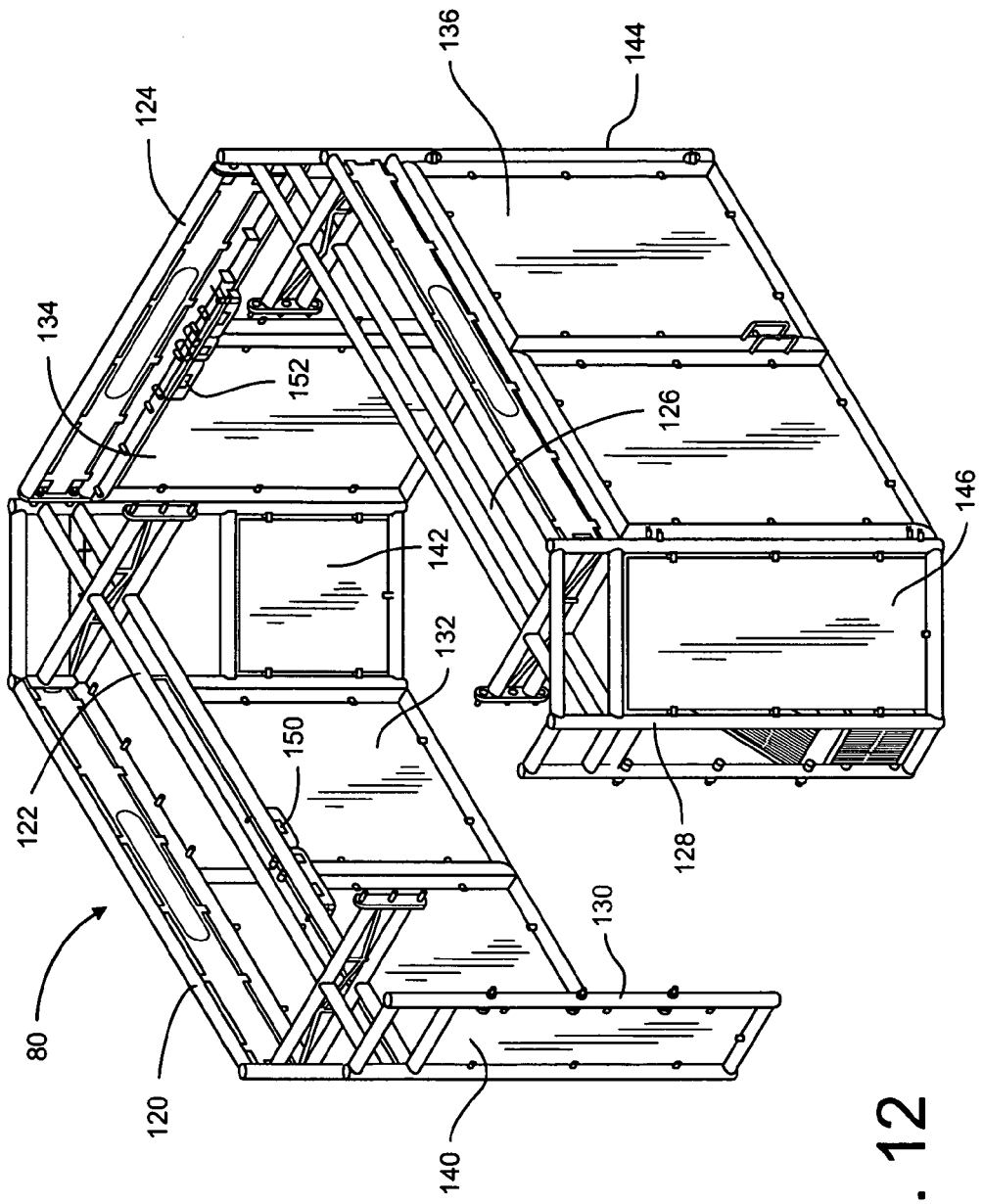
FIG. 12 is a downward looking isometric view of a safety enclosure of the dispensing apparatus.

The safety enclosure 80, FIG. 12, includes a number of brace members, such as the brace members 120, 122, 124, 126, 128, 130 for substantially enclosing the head assembly 64, FIG. 8, to protect operators from moving parts. The safety enclosure 80 includes double doors 132, 134, 136, 140, 142, 144, 146 with clear plastic panels, such as those made of polycarbonate. The doors, when closed, allow safe visual inspection of the operation of the dispensing apparatus, and when opened, provide access to all of the mechanisms of the head assembly, such as the rake assemblies 72, 73, the upper funnels 74, 75, the receiving conveyor assemblies 68, 70, and the funnel groups 76, 78, for cleaning and maintenance. Safety switches, such as safety switches 150, 152, are mounted to the safety enclosure double doors to stop operation of the dispensing apparatus when one or more of the doors are opened, another safety feature. In the alternative, glass or stainless steel with holes or slots may be used for the door panels instead of plastic, and the shape of the safety enclosure may be reconfigured to accommodate existing equipment.

Figure 13:
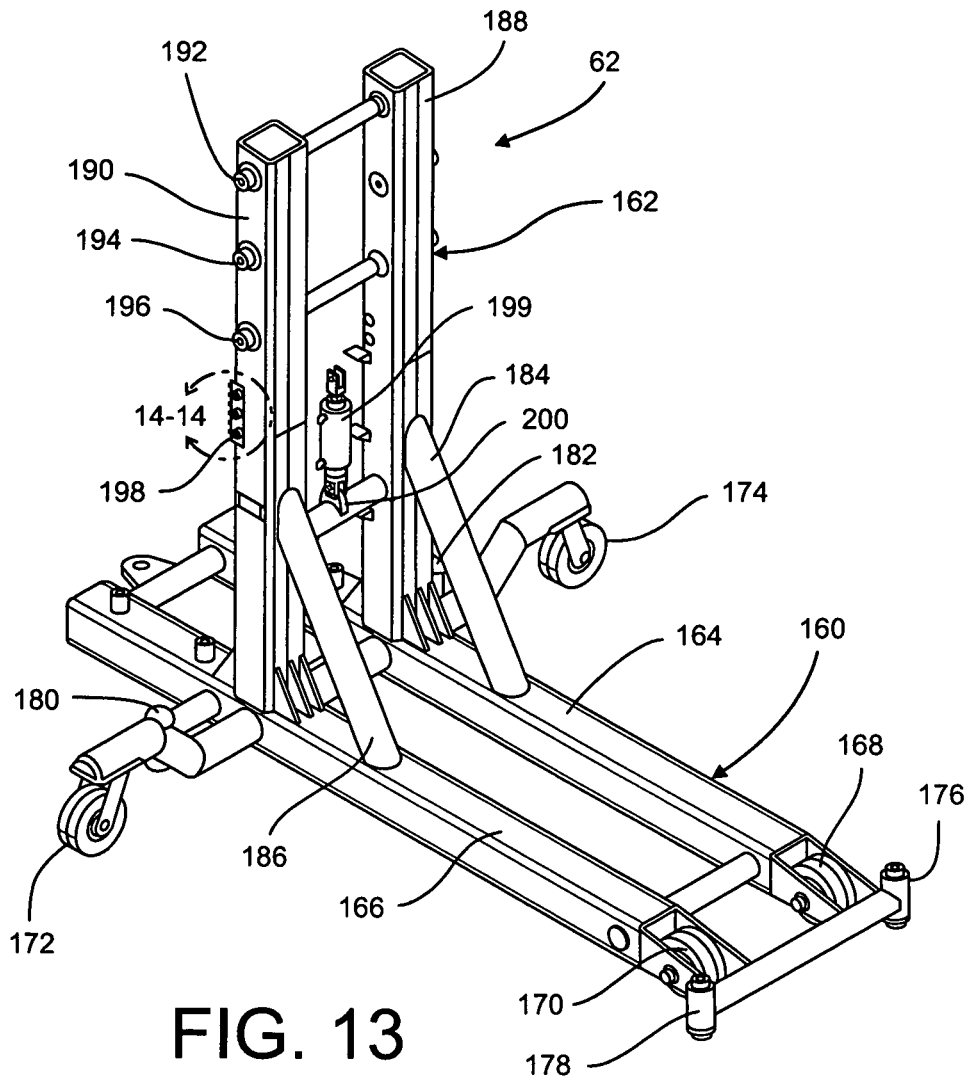
FIG. 13 is an isometric view of a base of the dispensing apparatus.
Figure 14:
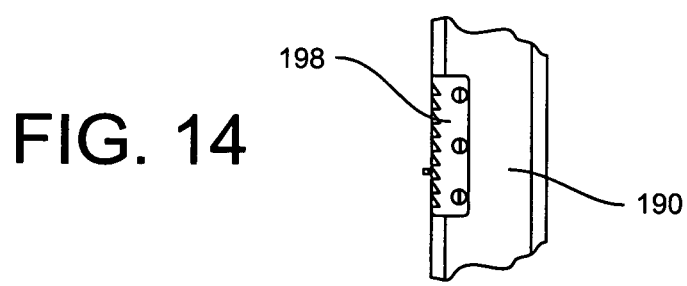
FIG. 14 is an enlarged view taken within the circle 14-14 of FIG. 13.

The base 62, FIGS. 13-14, is L-shaped with a generally horizontal portion 160 and a generally vertical portion 162. The horizontal portion 160 includes two spaced apart legs 164, 166, in parallel alignment, four wheels 168, 170, 172, 174 on which are mounted the horizontal legs, and four leveling feet 176, 178, 180, 182. The wheels and the feet enable the dispensing apparatus to be easily moved into alignment with an existing target conveyor system, such as the target conveyor system 18, FIG. 1, simply by wheeling the dispensing apparatus to a predetermined location and adjusting the dispensing apparatus to properly align with the existing conveyor system. An important feature of the dispensing apparatus is that the dispensing apparatus may be easily retrofitted to an existing target conveyor system. The dispensing apparatus may be modified to enable the apparatus to be mounted in a permanent relationship to a target conveying system such that the wheels and feet of the base are not needed.

Two braces 184, 186 attached to the horizontal portion 160 are also attached to the vertical portion 162 and help support the vertical portion of the base. The vertical portion 162 of the base 62 includes two spaced apart arms 188, 190, each with three cams, such as the three cams 192, 194, 196 extending from the vertical arm 190. The three cams 192, 194, 196 are located to extend into the three openings 115, 116, 117, FIG. 8, respectively, in the side plate 94 of the frame 90 to help guide and support the head assembly 64 vertically relative to the base 62 when the head assembly is adjusted, another feature facilitating alignment of the dispensing apparatus with an existing target conveyor system.

Figure 10:
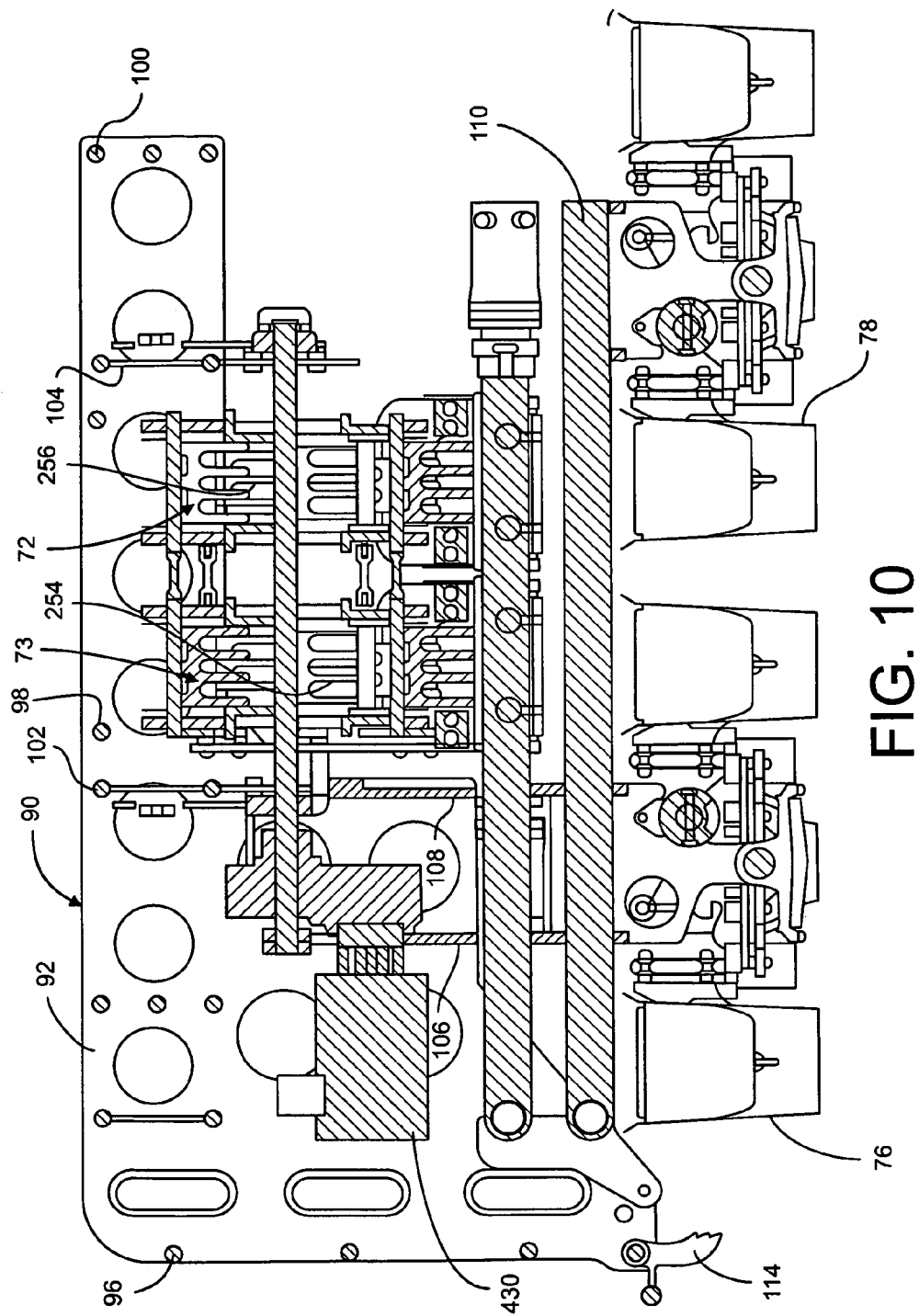
FIG. 10 is a slightly enlarged cross sectional view taken along line 10-10 of FIG. 9.
Figure 11:
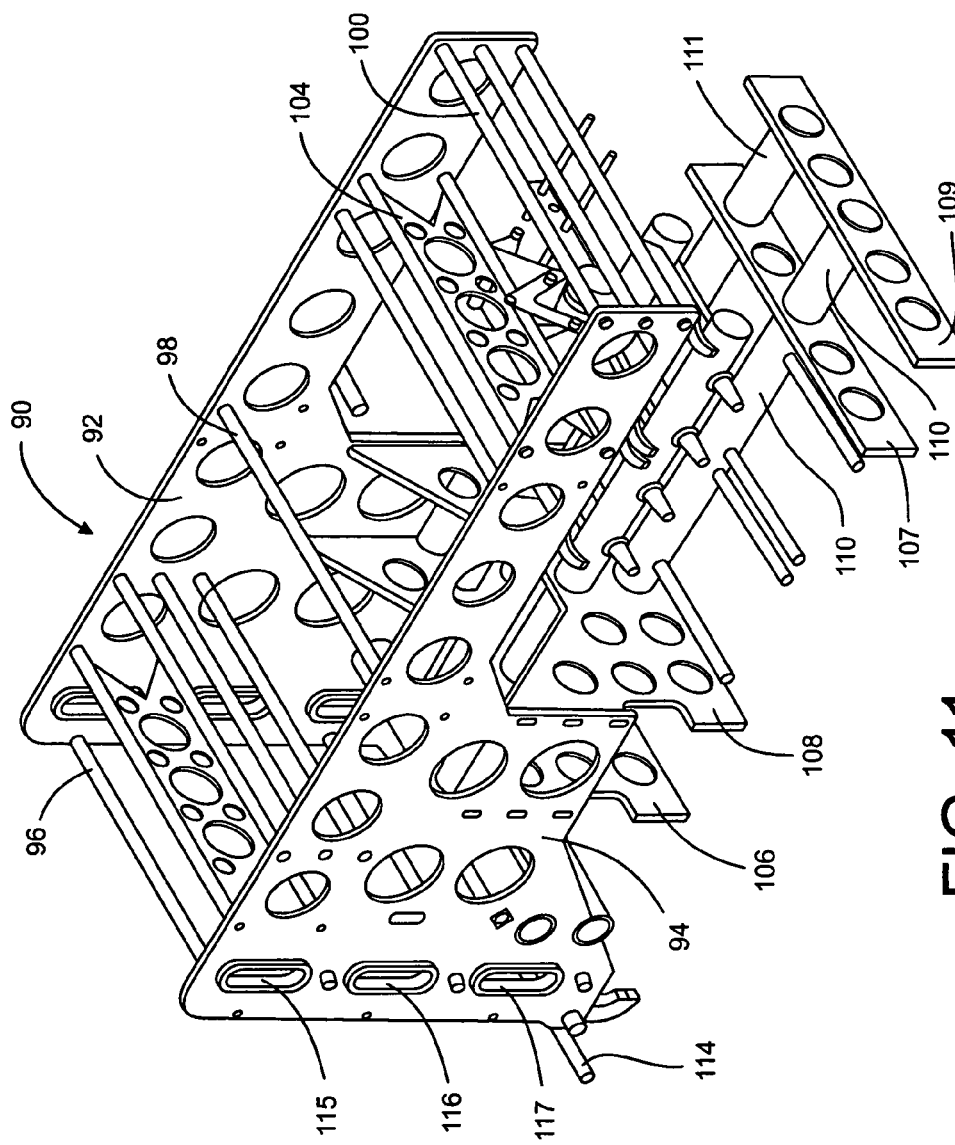
FIG. 11 is a downward looking isometric view of a frame of the head assembly shown in FIGS. 8-10.

Another safety feature of the dispensing apparatus 60 is provided by a ratchet mechanism including racks mounted to the arms 188, 190, such as the rack 198 mounted to the arm 190, and the pawl 114, FIGS. 8-10, pivotally mounted to the frame 90. The frame may be raised and lowered using the hydraulic system in the cabinet 84 operating a hydraulic cylinder 199 mounted to a bracket 200 on the vertical portion 162 of the base 62 and attached to another bracket 201, FIG. 9, on the head assembly 64. As the head assembly 64 is raised relative to the base 62, the pawls pivot and sequentially engage adjacent teeth of the racks to ensure that a malfunction of the hydraulic system will not cause the head assembly 64 to fall precipitously and cause injury. In the alternative, a base may be mounted permanently in a stationary position and therefore be constructed on a permanent base, and a head assembly may be attached to the base so as to be fixed relative to a target conveyor system.

Figure 15:
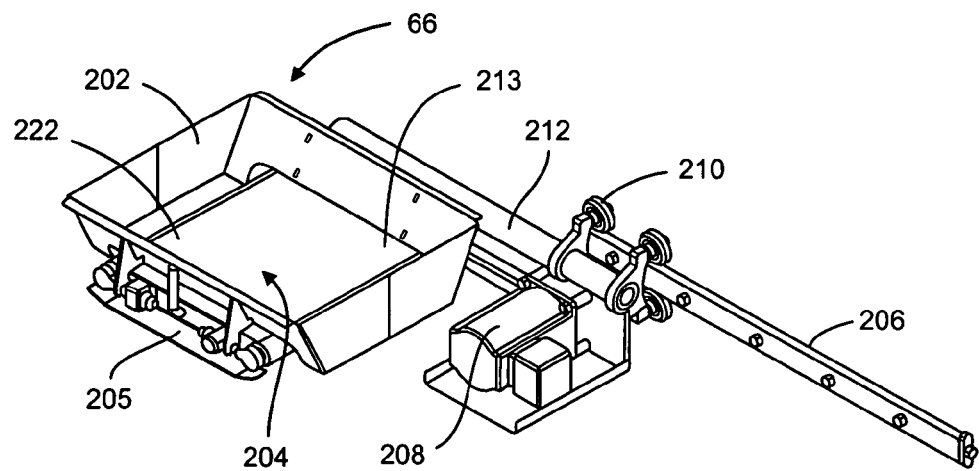
FIG. 15 is an isometric view of an intake conveyor assembly of the dispensing apparatus.
Figure 16:
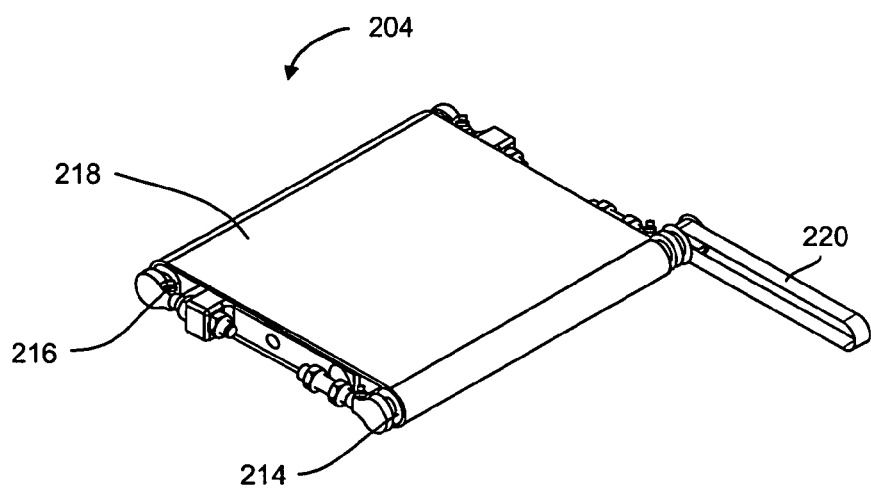
FIG. 16 is an enlarged isometric view of a conveyor system of the intake conveyor assembly shown in FIG. 15.

The intake conveyor assembly 66, FIGS. 15 and 16, includes a hopper 202, a conveyor mechanism 204, a tray 205 below the conveyor mechanism, a rail 206, a motor 208 for adjusting the position of the intake conveyor 66 along the rail 206 and for driving the conveyor mechanism 204, a wheel set 210 for riding along the rail, and a conveyor mechanism mounting tube 212 that is also mounted to the wheel set. The hopper 202 directs the product from the delivery conveyor 40 to an upstream portion 213 of the conveyor mechanism 204. The hopper 202, the conveyor mechanism 204, and the tray 205 are supported by the mounting tube 212 and are attached to the wheel set 210 and the motor 208. The motor 208 drives the hopper and conveyor belt mechanism along the rail 206 to facilitate receipt and delivery of product to be dispensed, an advantage of the dispensing apparatus. The conveyor belt mechanism 204 includes an adjustable drive roller 214, a driven roller 216, a conveyor belt 218 mounted to the drive and driven rollers 214, 216, and a timing belt 220 that connects the drive roller 214 and the motor 208. Product deposited upon the conveyor belt 218 is transported to a downstream end 222 of the conveyor belt 218 and then dropped onto the receiving conveyor assemblies 68, 70.

The receiving conveyor assemblies 68, 70, are each essentially the same structurally as the other with portions of one being the mirror image of the other. The receiving conveyor assemblies 68, 70 are mounted to the upper tubes 112, 113, FIG. 8, of the frame 90. As advantages, the receiving conveyor assemblies feature a quick tension release of a conveyor belt, such as a conveyor belt 230, FIG. 17, of the receiving conveyor assembly 68, a fine tension adjustment of the conveyor belt 230, and an adjustable drive roller, such as the drive roller 232, FIGS. 18 and 19, so that the drive roller is always aligned with a drive mechanisms, such as alignment of the drive roller 232 with a drive motor 234, a gear set 236, a drive plug 238, and a drive hub 240 in the drive roller 232. The receiving conveyor assembly 68 includes two elongated, longitudinally mounted, brackets 242, 244 which have openings 246, 248 at upstream end portions 250, 252 to house bearings 254, 256 for the adjustable drive roller 232. Elongated slots 258, 260 are formed in the downstream end portions 262, 264 of the elongated brackets to enable conveyor belt tension adjustments. The elongated brackets 242, 244 are connected to the frame 90 by threaded pins 266, 268 and locknuts 270, 272.

Figure 19:
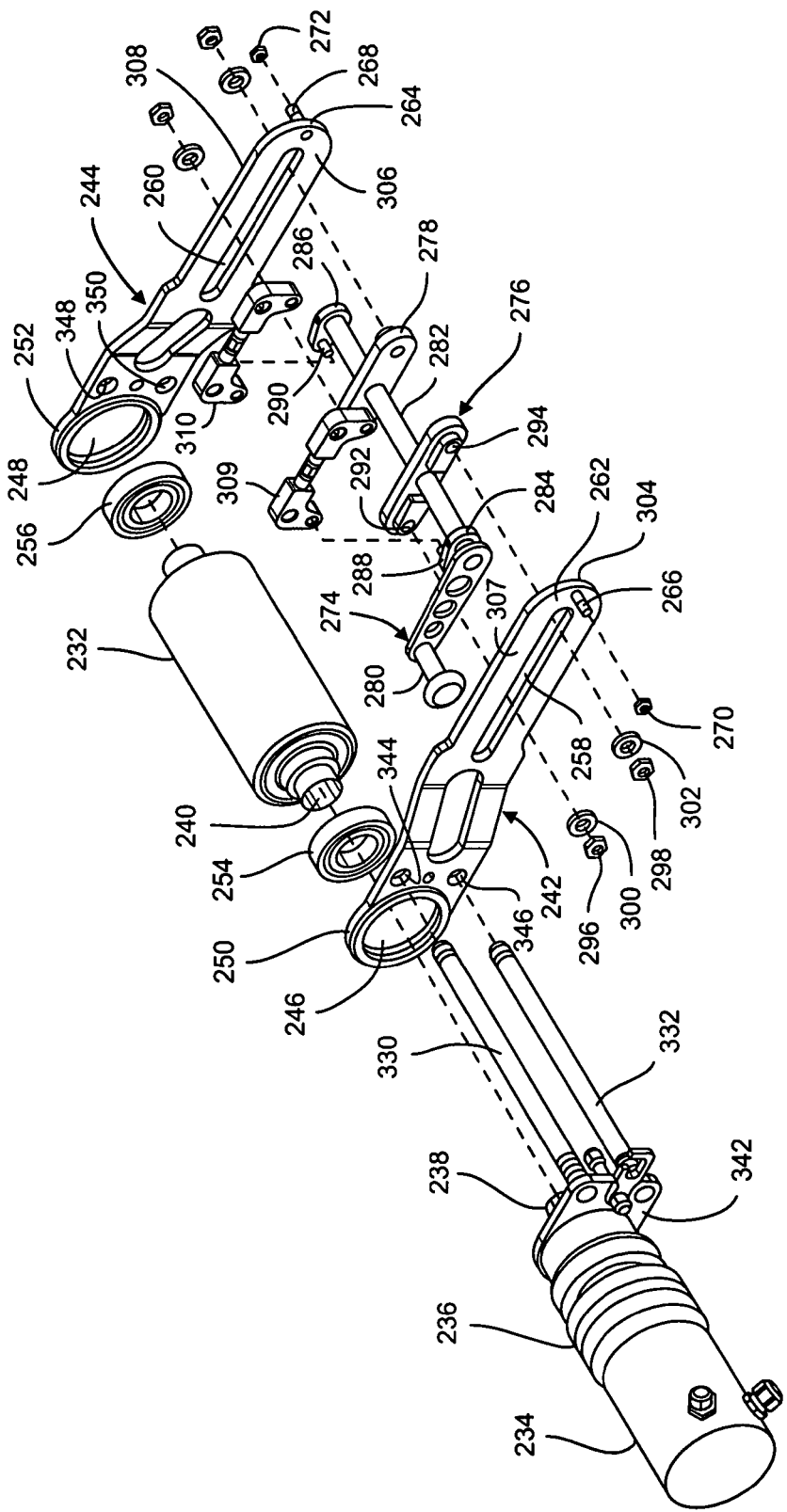
FIG. 19 is an enlarged exploded isometric view of the adjustable drive assembly shown in FIG. 18.
Figure 20:
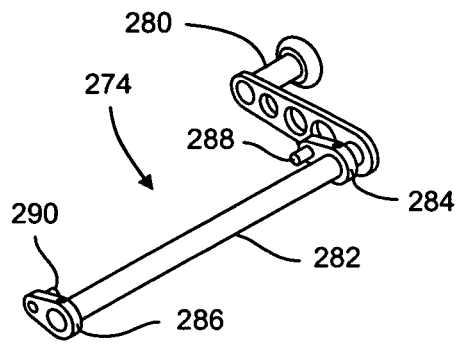
FIG. 20 is an isometric view of a handle assembly of the adjustable drive assembly shown in FIG. 19, but rotated about 90° from its view in FIG. 19.
Figure 21:
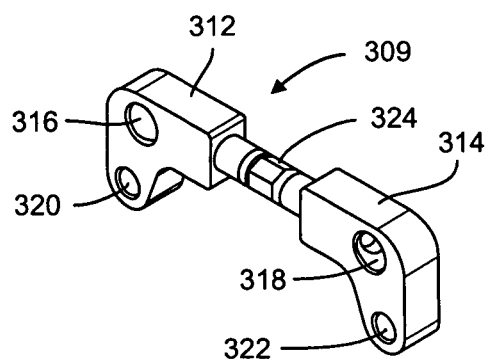
FIG. 21 is an enlarged isometric view of a pivot link of the adjustable drive assembly shown in FIG. 19.

Mounted to slide in the elongated slots 258, 260, as shown in FIGS. 19-21, are a handle assembly 274 connected to two slide blocks 276, 278. The handle assembly 274 includes a handle crank 280 connected to a shaft 282, and mounted to the shaft are tabs 284, 286, each with a pin 288, 290. Each slide block 276, 278 includes two threaded posts, such as the posts 292, 294 of the slide block 276, and the posts are engaged by locknuts and washers, such as the locknuts 296, 298 and the washers 300, 302, to mount the slide blocks to the elongated brackets 242, 244. The mounted slide blocks 276, 278 are able to slide the handle assembly 274 along the elongated slots 258, 260 in a direction parallel to the longitudinal axis of the receiving conveyor assembly 68. The slide blocks 276, 278 are positioned to slide along inside surfaces 304, 306 of the elongated brackets 242, 244. Mounted to outside surfaces 307, 308 of the two elongated brackets are two pivot links 309, 310. Each pivot link, such as the pivot link 309, FIG. 21, includes opposing end blocks, such as the end blocks 312, 314, and each end block has an upper hole, such as the holes 316, 318, and a lower hole, such as the holes 320, 322.

The end blocks 312, 314 are connected to opposite ends of an adjustment screw 324. Rotation of the adjustment screw 324, by a wrench, for example, moves the opposing end blocks toward or away from each other. The end block 314 of the pivot link 309 is pivotally attached through the hole 322 to the pin 266 of the elongated bracket 242. The other end block 312 of the pivot link 309 is attached through the hole 320 to the pin 288 of the tab 284 mounted to the shaft 282. The pivot link 310 is mounted to the elongated bracket 244 and the tab 286 in a like manner. By rotating the adjustment screws of the pivot links 309, 310, such as the adjustment screw 324 of the link 309, fine adjustment may be made to the tension on the conveyor belt 230. Rotating the handle crank 280 causes each of the pivot links 309, 310 to be rotated upwards to quickly release tension in the conveyor belt 230 to enable cleaning and maintenance. As can be appreciated, the structures for the fine adjustment of the conveyor belt tension and for the quick release of tension on the conveyor belt are examples of the compactness and robustness of the dispensing apparatus 60.

The adjustable drive roller assembly, FIGS. 19, 22-24, includes the motor 234, the gear set 236, the drive plug 238, the roller 232 with the drive hub 240, and two bearing posts 330, 332. Each of the two bearing posts 330, 332 has two spaced apart curved bearing portions 334, 336, 338, 340 enabling movement of the bearing posts relative to the elongated brackets 242, 244 to allow multi-axes adjustments while maintaining the motor 234, the gear set 236 and the drive plug 238 in alignment with the drive hub 240 of the roller 232. For example, after operation of the dispensing apparatus or after cleaning and maintenance, the conveyor belt 230 may no longer align fully with the drive roller 232. To facilitate alignment or "tracking" of the roller with the conveyor belt, the conveyor drive roller 232 is crowned, and the motor 234 and gear set 236 are mounted to a bracket 342, which also mounts the two bearing posts 330, 332.

Figure 22:
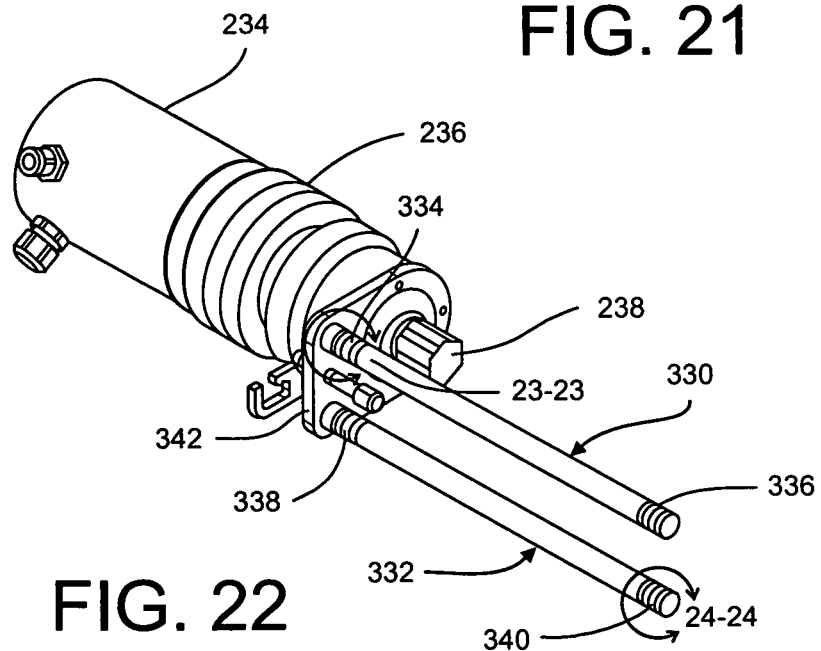
FIG. 22 is an isometric view of a motor, a gear set and two bearing posts of the adjustable drive assembly shown in FIG. 19, but rotated about 90° from its view in FIG. 19.
Figure 24:
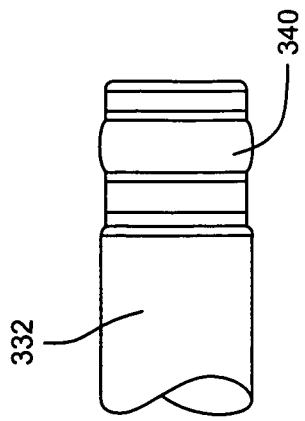
FIG. 24 is an enlarged elevation view taken within circle 24-24 of FIG. 22.
Figure 23:
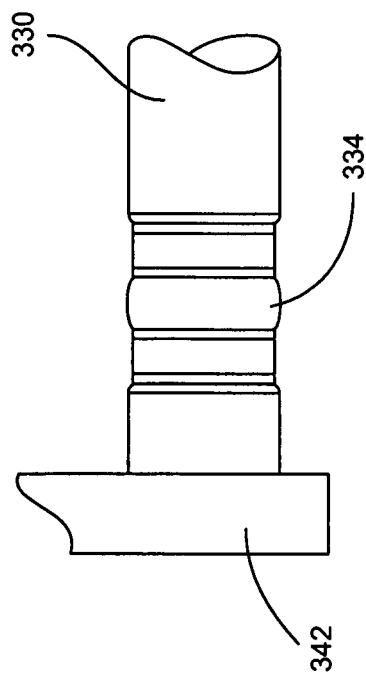
FIG. 23 is an enlarged elevation view taken within circle 23-23 of FIG. 22.
Figure 25:
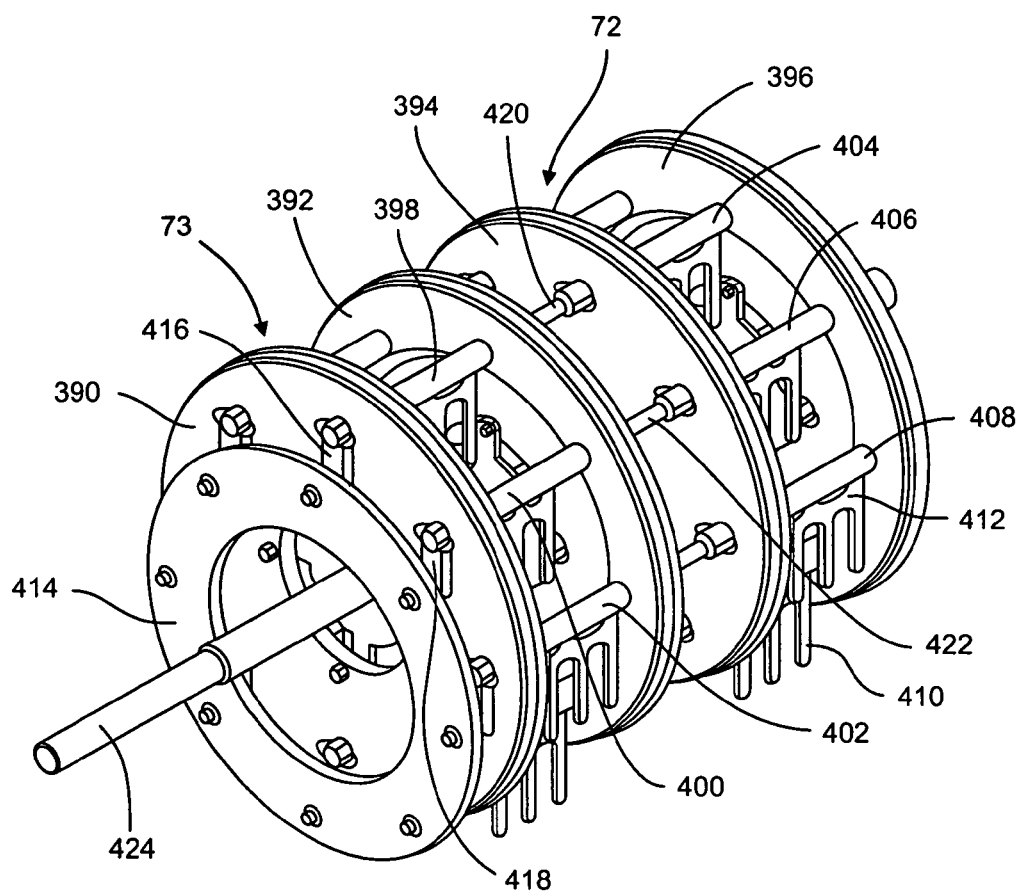
FIG. 25 is an enlarged isometric view of two rake assemblies of the head assembly shown in FIG. 8 but rotated about 90° from their view in FIG. 8.

The curved bearing portions 334, 336, 338, 340, FIG. 22, of the bearing posts are assembled in openings 344, 346, 348, 350, FIG. 19, respectively, in the elongated brackets 242, 244. Moving the drive roller 232 to improve belt tension or tracking may disrupt the alignment of the drive plug 238 with the mating drive hub 240. The curved bearing surfaces 334, 336,

338, 340 moving in the openings 344, 346, 348, 350 allow fine tension adjustments to be made to the conveyor belt 230 and/or correct tracking of the roller relative to the conveyor belt 230 while maintaining the drive plug 238 and the drive hub 240 in alignment. The bearing posts with the curved surfaces mounted in the elongated brackets 242, 244, allow the motor 234, the gear set 236, the drive plug 238, and the roller 232 to be adjusted as a single unit relative to the elongated brackets 242, 244. As a result, no matter what the attitude of the drive roller 232 is, alignment of the motor, the gear set, the drive plug, and the drive hub is maintained. The adjustable drive is yet another example of the compactness and robustness of the dispensing apparatus.

Figure 17:
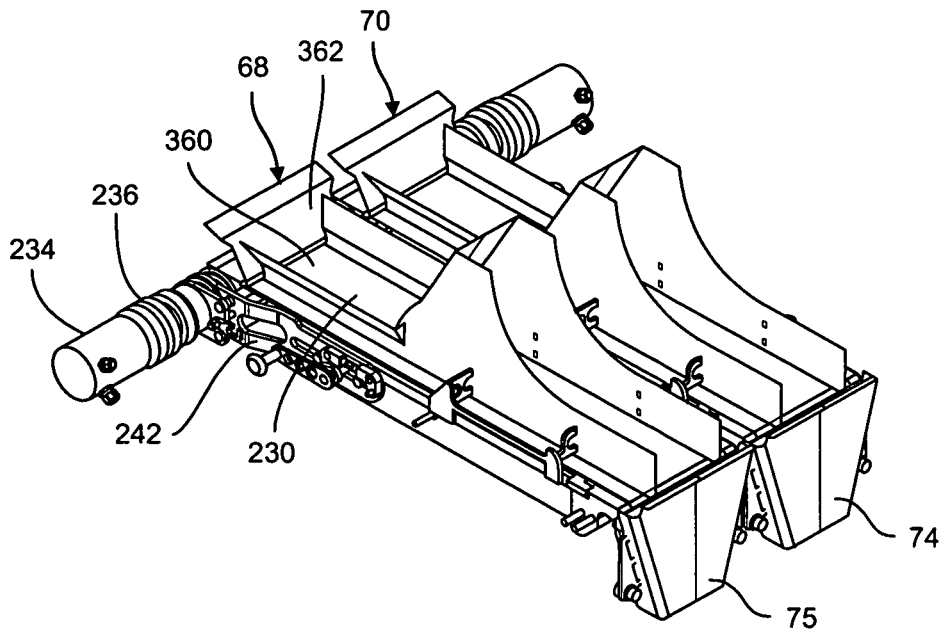
FIG. 17 is an isometric view of two receiving conveyor assemblies of the dispensing apparatus.
Figure 18:
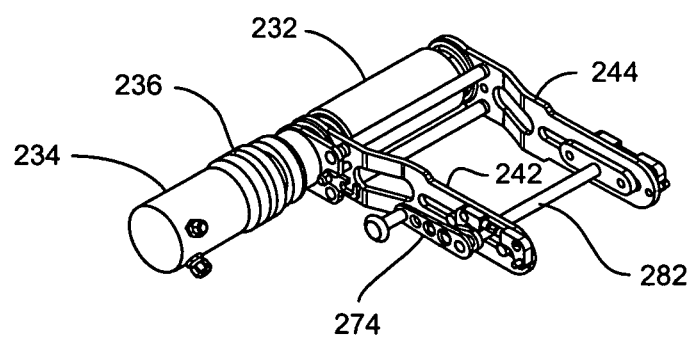
FIG. 18 is an isometric view of an adjustable drive assembly of one of the receiving conveyor assemblies shown in FIG. 17.

The receiving conveyor assembly 70, FIG. 17, includes a conveyor belt, a motor, a gear set, a drive plug, a drive hub, and a drive roller just like those of the receiving conveyor assembly 68. The receiving conveyor assembly 70 also includes elongated brackets, a handle assembly, slide blocks and pivot links just the same as the receiving conveyor assembly 68.

A receiving or upstream end 360, FIG. 17, of the conveyor belt 230 is located under a hopper 362 for receiving and directing the product to be dispensed from the intake conveyor assembly 66. The conveyor belt 230 moves product to be dispensed downstream, generally from left to right as shown in FIG. 17, passed the rake assembly 73, FIG. 8, toward the upper funnel 75 to direct the product to the funnel group 76 moving below the upper funnel 75. It is noted that the conveyor belts of the receiving conveyor assemblies move in a direction opposite from that of the target conveyor to enhance the compactness feature of the dispensing apparatus. However, doing so causes problems to which the upper funnels are solution as will be explained below. Product delivered to the upper funnel is loosened, spread and leveled by prongs, such as the prongs 254, FIG. 10, of the rake assembly to help meter the product that falls through the upper funnel 75 and into lower dispensing funnels of the funnel group 76. The velocity of the conveyor belts of the receiving conveyor assemblies, such as the conveyor belt 230, also helps meter product. The arrangement and operation of the receiving conveyor assembly 70, the rake assembly 72, the upper funnel 74, and the funnel group 78 are identical to that of the just described structure and operation relating to the receiving conveyor assembly 68.

Referring now to FIGS. 25-28, the two rake assemblies 72, 73 are shown in more detail. Each rake assembly includes two spaced apart circular side plates 390, 392, 394, 396, to which are mounted a number of shafts and prongs, such as the shafts 398, 400, 402 on the rake assembly 73 and shafts 404, 406, 408 on the rake assembly 72. The prongs are in alternate sets of three and four prongs, such as the three prong set 410 and the four prong set 412, for metering product by loosening, spreading, leveling and adjusting the height of product before the product is propelled to the funnel groups through the upper funnels 74, 75. Mounted to the side plate 390 are an offset plate 414 and several offset arms, such as the offset arms 416, 418. Between the two rake assemblies 72, 73 are several couplings, such as the couplings 420, 422, and both assemblies are mounted to a central shaft 424 to enable rotation of the rake assemblies.

Figure 26:
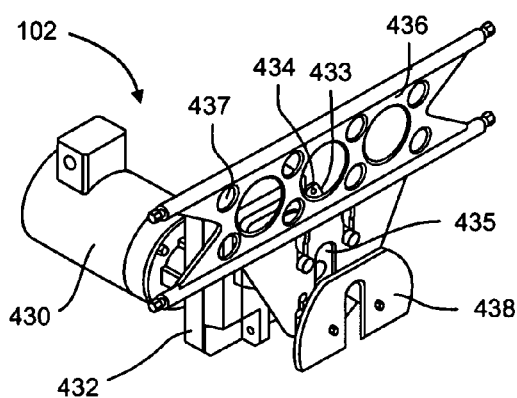
FIG. 26 is an enlarged isometric view of a first end support assembly with a drive motor and a gear set for rotating the rake assemblies.
Figure 27:
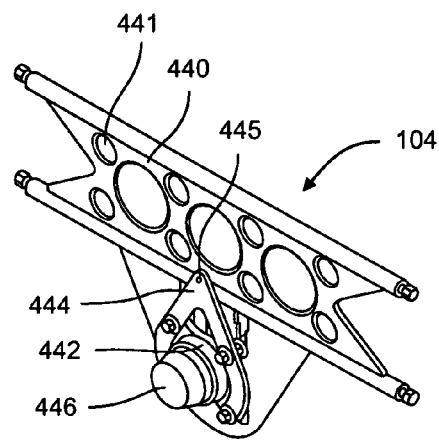
FIG. 27 is an enlarged isometric view of a second end support assembly for the rake assemblies.

The central shaft 424 is mounted to the first and second end support assemblies 102, 104, FIGS. 26 and 27. The first end support assembly 102 includes a rake motor 430, a gear set 432, a torque bracket (not shown), a hanger plate 433 with a top opening 434, a bearing flange 435, an end support plate 436 with several openings, such as the opening 437, and a rake offset plate 438. The second end support assembly 104 includes an end support plate 440 with several openings, such as the opening 441, a bearing flange 442, a hanger plate 444 with a top opening 445, and a bearing cap 446. The end support assemblies support the shaft 424 and enable the motor 430 to rotate the rake assemblies.

Figure 28:
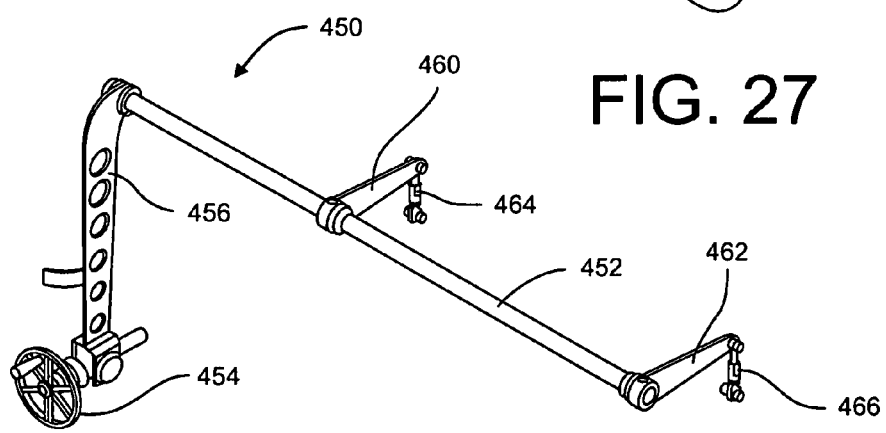
FIG. 28 is an enlarged isometric view of a rake height adjustment assembly for the rake assemblies.

A rake height adjustment assembly 450, FIG. 28, is mounted to the end support plates 436, 440 and is connected to the hanger plates 433, 444. The rake height adjustment 450 assembly includes a shaft 452, an adjustment wheel 454, a long link 456 connected to the wheel 454 and to the shaft 452, two link arms 460, 462 mounted to the shaft 452, and two adjustable and pivotal link fingers 464, 466, each pivotally mounted to one of the link arms as shown. The shaft 452 is positioned in the openings 437, 441 of the end support plates 436, 440, respectively. The end support plates 436, 440 are part of the frame 90. The link fingers 464, 466 are connected to the top openings 434, 445, respectively, of the hanger plates 433, 444. Rotation of the wheel 454 pivots the long link 456 and the long link rotates the shaft 452. Rotation of the shaft 452 causes the link arms 460, 462 to raise or lower the link fingers 464, 466 depending upon the direction of rotation of the wheel 454. Hence, rotation of the adjustment wheel 454 rotates the shaft 452 that results in the central shaft 424 being raised or lowered. Raising or lowering the central shaft 424 causes the rake assemblies 72, 73 to move away from or closer to the conveyor belts of the receiving conveyor assemblies 68, 70 resulting in control of the height, and thereby of the volume, of product moving to the downstream ends of the receiving conveyor assemblies and through the upper funnels 74, 75. The structure just describe is yet another example of the compactness and robustness of the dispensing apparatus.

Varying the speed of the conveyor belts of the receiving assemblies 68, 70 that transport the product, may also meter product. When the conveyor belts are moving rapidly the product is propelled in an arc away from the conveyor belt downstream ends in a direction opposite to that of the moving targets on the target conveyor system. The advantages of having the upper funnels 74, 75, which are adjustably mounted, are that the product is both contained as it falls and redirected by aiming the upper funnels. Redirecting the energy of the arcing product to move more in the direction of the targets facilitates control of the product to restrict spread and results in more precise deposits.

Referring now to FIGS. 29-32 the funnel groups 76, 78 are disclosed in more detail by focusing on the funnel group 78, which is a mirror image of the funnel group 76, and which contains the same structural elements as found in the funnel group 76. The funnel group 78 includes ten dispensing funnels 470, 472, 474, 476, 478, 480, 482, 484, 486, 488 positioned in a racetrack configuration supported by the lower tubes 110, 111, FIG. 8. A racetrack configuration includes semicircular end portions connected by a central rectangular portion. The racetrack configuration is clearly illustrated in the plan view of FIG. 31. As mentioned earlier, the racetrack configuration may also be called a stadium design. The racetrack configuration is important because some earlier configurations, such as that found in U.S. Pat. No. 5,458,055 to Fitch Jr., necessitates a special semi-circular design for a target conveyor system to match partially, a circular path taken by a cylindrical food storage carousel disclosed in the patent. Therefore, the Fitch apparatus cannot be retrofitted to the usual existing target conveyor system without extensive modification of the target conveyor system. In contrast, the present invention may be used with the usual linear conveyor system 490 (or a conveyor system having a linear portion) as shown in phantom lines in FIG. 29, for transporting target containers 492, 494, 496, 498, 500, 502, 504, 506 (also drawn in phantom lines) because the dispensing apparatus 60 includes, in part, the dispensing funnels moving in a linear fashion to match the movement of the target containers being transported on the linear portion of the conveyor system 490.

The dispensing funnels are mounted to a racetrack shaped rail 510 that is mounted to two spaced apart support panels 512, 514. The two support panels 512, 514 are connected to the lateral panels 107, 109, FIG. 8, that are in turn, mounted to the lower tubes 110, 111. Also mounted to the support panels 512, 514 is a racetrack shaped guide pan or structure 520 and two cover panels 522, 524. The support panels 512, 514 also serve as mounts for a motor 530, a gear set 532, and a drive roller 534 with a helical groove. A first pulley 536 is connected to the gear set 532 and a second pulley 538 is connected to the helical roller 534, and both pulleys 536, 538 are engaged by a timing belt 540 such that the motor 530 drives the helical roller 534, and the helical roller 534 drives the ten dispensing funnels 470, 472, 474, 476, 478, 480, 482, 484, 486, 488 as will be explained.

Figure 29:
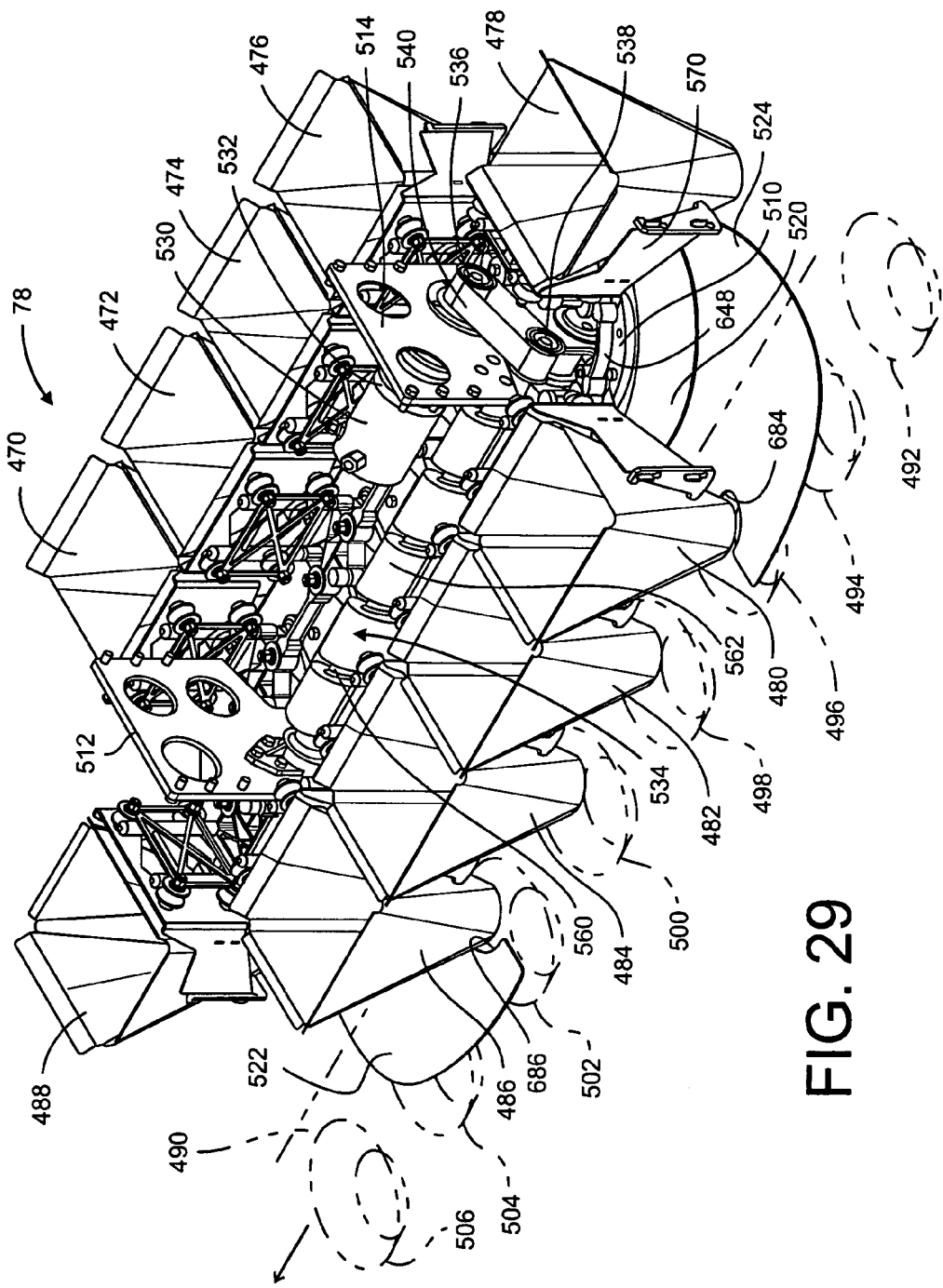
FIG. 29 is an enlarged isometric view of a funnel group of the dispensing apparatus and, in phantom lines, target containers on a conveyor.
Figure 30:
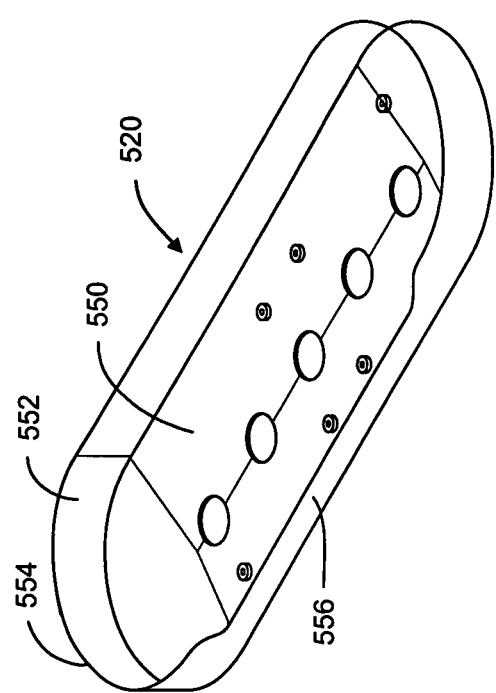
FIG. 30 is an isometric view of a guide pan of the funnel group shown in FIG. 29.
Figure 31:
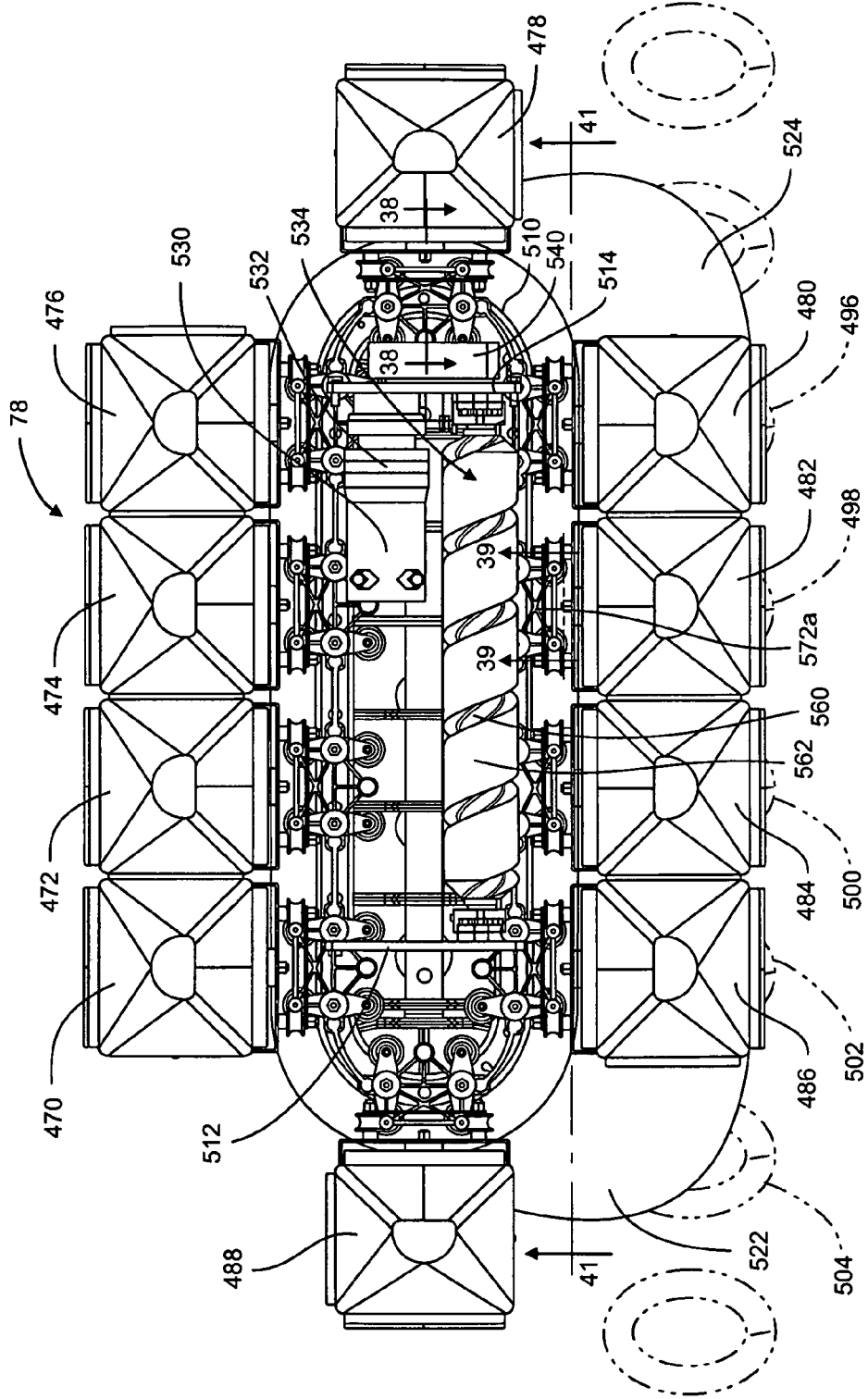
FIG. 31 is a plan view of the funnel group shown in FIG. 29 and, in phantom lines, the target containers.

The guide pan 520, FIG. 30, includes a bottom portion 550 and a wall portion 552 with a top rim 554. The wall portion 552 has a front portion 556 of reduced height so that the top rim 554 is recessed and causes the dispensing funnels, which are guided along the top rim 554, to also move downward toward the target containers being transported on the conveyor system 490 as the dispensing funnels move around the rail 510 in a clockwise direction above the conveyor system 490 moving generally right to left in view of FIG. 29. The cover panels 522, 524 are flat sheets that cover selected target containers and block open bottoms of the dispensing funnels until the dispensing funnels receive the product to be dispensed from the upper funnel 74, are lowered at the recessed front portion 556, and move in synchronization over the target containers. To facilitate movement of the dispensing funnels, the drive roller 534 includes a helically shaped groove 560 in an outer surface 562 of the roller 534 for engaging and driving selected dispensing funnels.

Each of the dispensing funnels is mounted to a funnel bracket, such as the funnel bracket 570, FIGS. 33-37, and each funnel bracket includes a funnel guide assembly, such as the funnel guide assembly 572 of the funnel bracket 570. The funnel bracket 570 includes a back portion 574 and two spaced apart projecting arm portions 576, 578 to which a dispensing funnel, such as the dispensing funnel 478, may be removably attached. Removability enables the dispensing funnels to be detached for ease of cleaning and for enabling a quick change to funnels with different shapes, if desired, as a function of the type of product to be dispensed and/or the speed of the apparatus. The funnel guide assembly 572 is attached to the back portion 574 of the funnel bracket 570 and includes a vertical guide portion 582, FIG. 33, and a horizontal guide portion 584, FIG. 36. The vertical guide portion 582 of the funnel guide assembly includes an alignment frame 586, a pan roller 588, and four guide rollers 590, 592, 594, 596. The guide rollers 590, 592, 594, 596 are mounted to threaded posts, such as the threaded post 597, and to the mounting frame 586. The pan roller 588 is mounted to the back portion 574 of the funnel bracket 570. The four guide rollers 590, 592, 594, 596 operate in two pairs with each pair being aligned vertically to enable the funnel bracket 570 and the attached dispensing funnel 478 to move vertically along two spaced apart parallel posts, such as the posts 600, 602 that are part of the horizontal guide portion 584. The pan roller 598 guides the funnel bracket by rolling along the top rim 554, FIG. 30, of the guide pan 520. When the funnel bracket 570 moves to the recessed front portion 556 of the guide pan 520, the top rim 554 acts as a cam and the pan roller 598 acts as a cam follower and follows the contours of the top rim. At the recessed front portion 556 the funnel bracket 570 is lowered vertically along the two posts 600, 602. When the funnel bracket 570 exits the recessed front portions 556 and raises, the pan roller 598 causes the funnel bracket 570 to move upward along the posts 600, 602.

Figure 38:
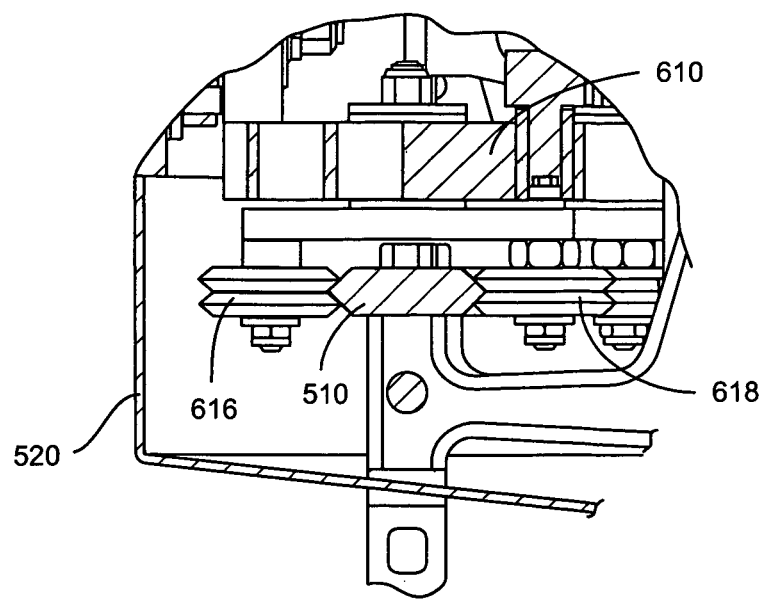
FIG. 38 is an enlarged cross sectional view taken along line 38-38 of FIG. 31.
Figure 39:
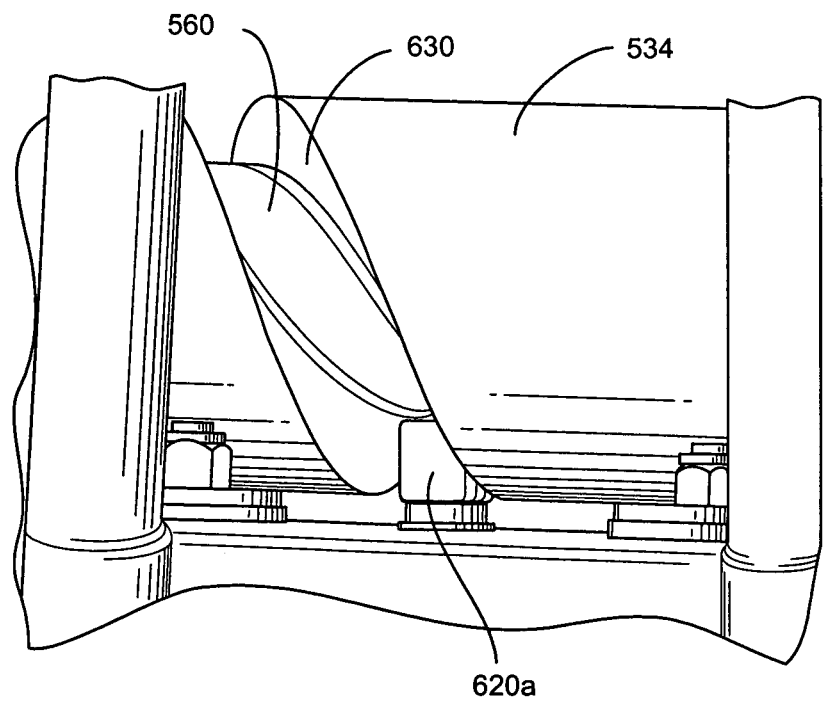
FIG. 39 is an enlarged elevation view of a drive roller groove and a cam follower taken along line 39-39 of FIG. 31.
Figure 40:
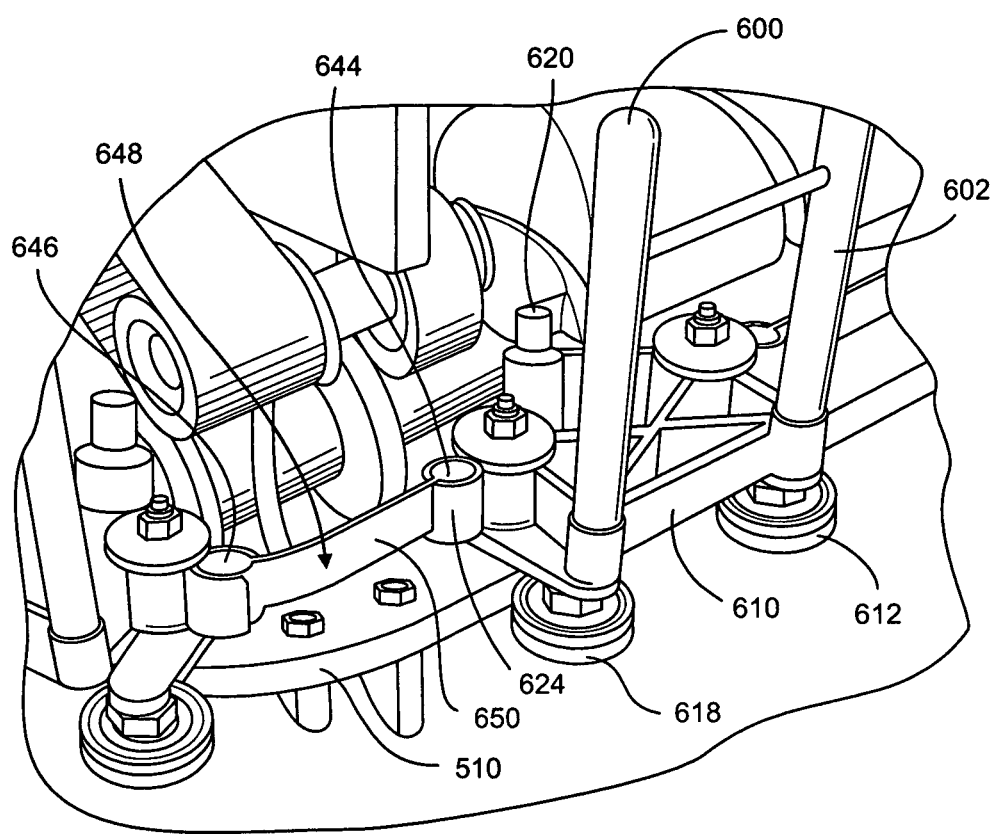
FIG. 40 is an isometric view of a flexible connector between adjacent funnel brackets.

The horizontal portion 584 of the funnel guide assembly 572 includes a mounting frame 610, to which is connected four rail rollers 612, 614, 616, 618, a cam follower pole 620 for engaging the roller 534 in the groove 560, which acts as a cam, a pair of end connectors 622, 624 and the posts 600, 602. As shown in FIG. 38, the rail rollers 616, 618 straddle the racetrack configured rail 510, as do the rail rollers 612, 614 (not shown in FIG. 38), two rollers on each side of the rail 510, for continually guiding the funnel bracket 478 around the rail 510. A cam follower pole 620a of another funnel guide assembly 572a, FIG. 31, rides in the groove 560, FIG. 39, of the roller 534 and as the roller revolves, the cam follower pole 620a is moved in the groove in a direction parallel to the longitudinal axis of the roller 534. The rotation of the roller 534 is the motive power for the funnel group 78 in that as each funnel bracket, such as a funnel bracket 670, FIG. 41, moves adjacent the roller 534, the cam follower pole, such as the cam follower pole 620a, of the funnel assembly is engaged by a trailing wall 630 of the groove 560 and is pushed forward causing all of the dispensing funnels, which are each connected to adjacent dispensing funnels, to move around the rail 510.

Figure 36:
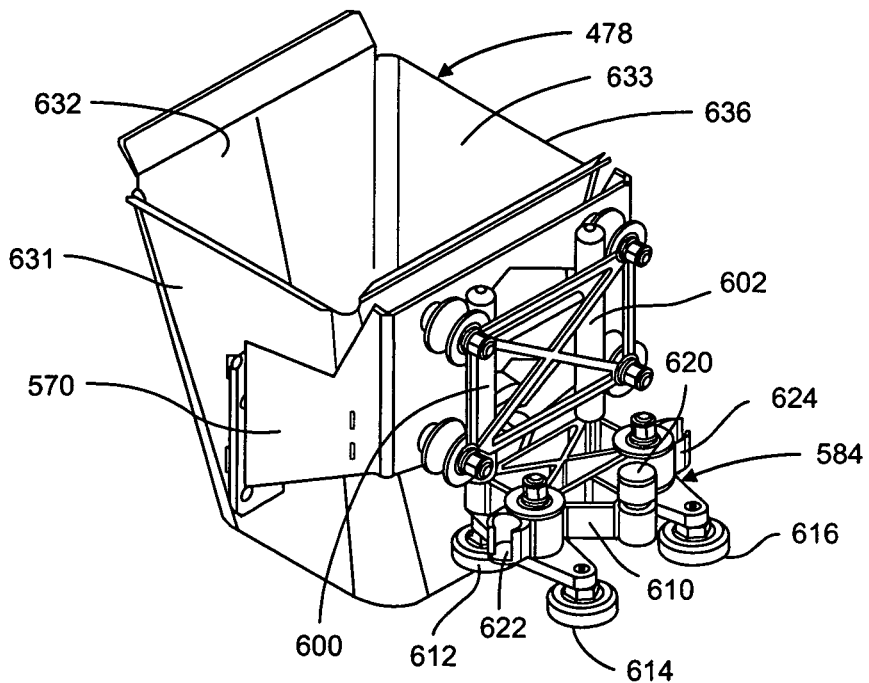
FIG. 36 is a rear isometric view of a complete funnel bracket and an attached dispensing funnel.
Figure 37:
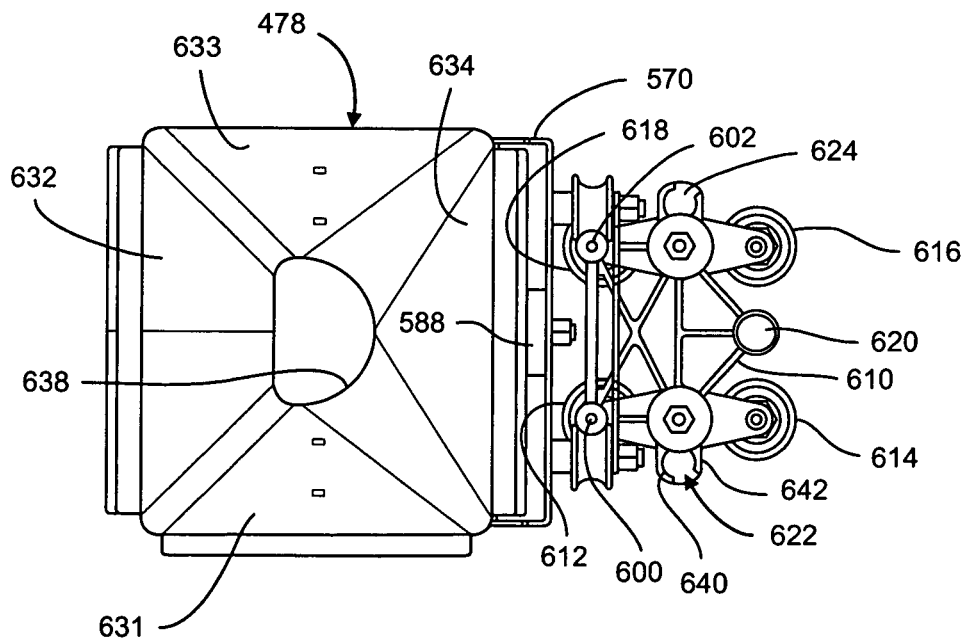
FIG. 37 is a plan view of the funnel bracket and the attached dispensing funnel shown in FIG. 36.

The dispensing funnel 478, FIGS. 36 and 37, has a generally tapered shaped with four walls 631, 632, 633, 634, an open top 636 and an open bottom 638. The open bottom 638 may have any desired shape, usually as a function of the shape of the target substrate and the product being handled. As shown in FIG. 37, the configuration of the open bottom 638 of the dispensing funnel 478 is D-shaped. In the alternative, other bottom and/or wall shapes may be used depending upon the product to be passed and/or the shape and size of the target substrate. As mentioned, when a dispensing funnel moves over the cover panels, the usually open funnel bottom is blocked.

Each of the end connectors 622, 624 includes a pair of curved arms, such as the arms 640, 642, FIG. 37, of the end connector 622. The curved arms of the connectors capture cylindrical end portions of a flexible connector, such as the end portions 644, 646, FIG. 40 of the flexible connector 648. Each flexible connector, like the connector 648, includes an integral flexible or bendable bridging strip, such as the bridging strip 650 between the end portions 644, 646, to directly connect adjacent dispensing funnels together. The use of flexible connectors to connect all of the dispensing funnels of a funnel group results in a motive force that engages any one or more of the dispensing funnels moves all of the dispensing funnels together at predetermined intervals. And the flexible connectors enable movement of the dispensing funnels of a funnel group around the racetrack-configured rail to which they are mounted. It is noted that each of the funnel brackets of the funnel groups 76, 78 are identical as are all of the dispensing funnels and end connectors.

Figure 41:
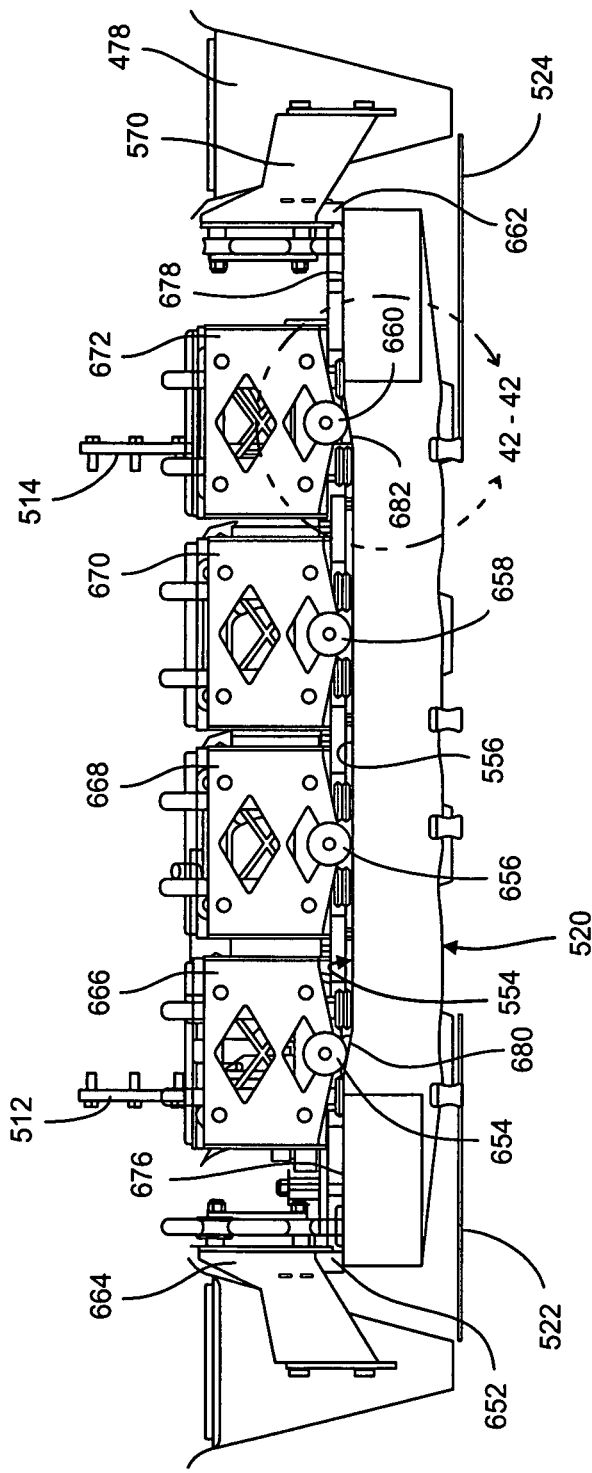
FIG. 41 is a sectional view taken along line 41-41 of FIG. 31.
Figure 42:
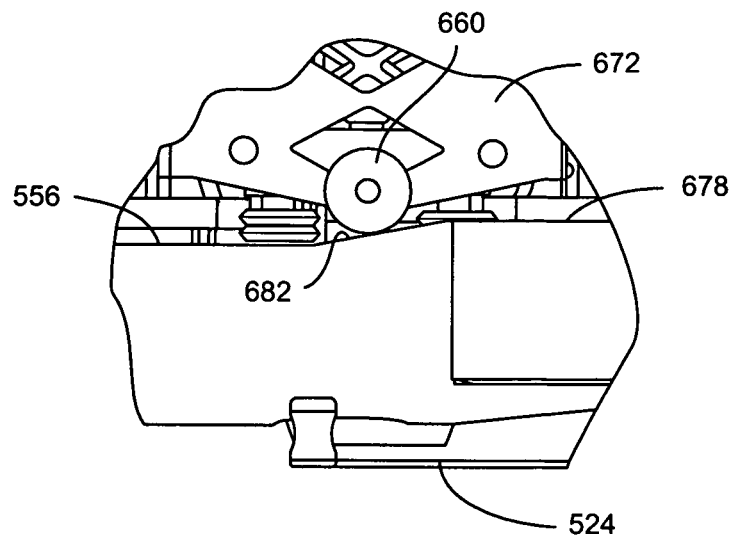
FIG. 42 is an enlarged elevation view taken within circle 42-42 of FIG. 41.
Figure 43:
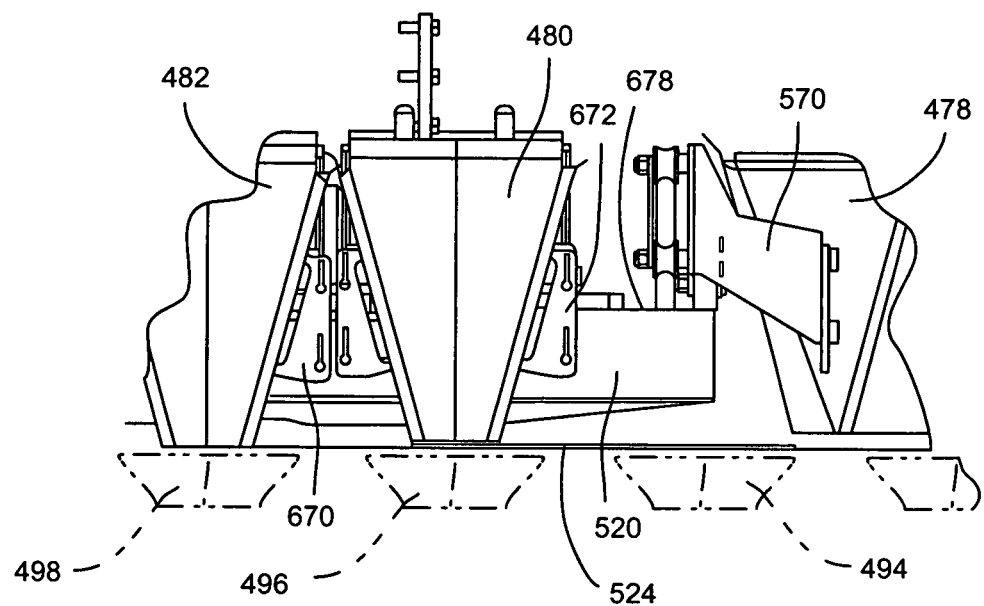
FIG. 43 is an enlarged elevation view taken within circle 43-43 of FIG. 32.

The relationship between the funnel brackets and the guide pan is illustrated in further detail in FIGS. 41-43. The guide pan 520 is illustrated in engagement with six pan rollers 652, 654, 656, 658, 660, 662 attached to six funnel brackets 664, 666, 668, 670, 672, 570, respectively, which support the six dispensing funnels 488, 486, 484, 482, 480, 478, FIG. 32, respectively. The top rim 554 of the guide pan 520 includes, in the view shown in FIG. 41, upper portions 676, 678, transition portions 680, 682, and the recessed front portion 556. As the dispensing funnels of funnel group 78 move right to left in the views shown in FIGS. 32 and 41, the funnel brackets move from a position shown for the funnel bracket 674 traveling along the upper portion 678 of the top rim 554 of the guide pan 520 to the position of the next funnel bracket 672 on the transition portion 682, shown enlarged in FIG. 42. The next two positions are that occupied by the funnel bracket 670 and the funnel bracket 668 located on the recessed front portion 556. The next position is that of funnel bracket 666 located on the transition portion 680 of the top rim 554, followed by the position of the funnel bracket 664 on the upper portion 676 of the top rim.

The dispensing apparatus 60 is made primarily of stainless steel, except for the plastic of the safety enclosure, and a suitable synthetic resin or resins for such structures as the helical rollers, the guide rollers and the flexible end connectors. When the dispensing apparatus handles food products, the apparatus must be thoroughly cleaned every day. Therefore, the materials used in the apparatus, stainless steel and synthetic resins, must be compatible with typical cleaning solutions and water used in the field.

Figure 32:
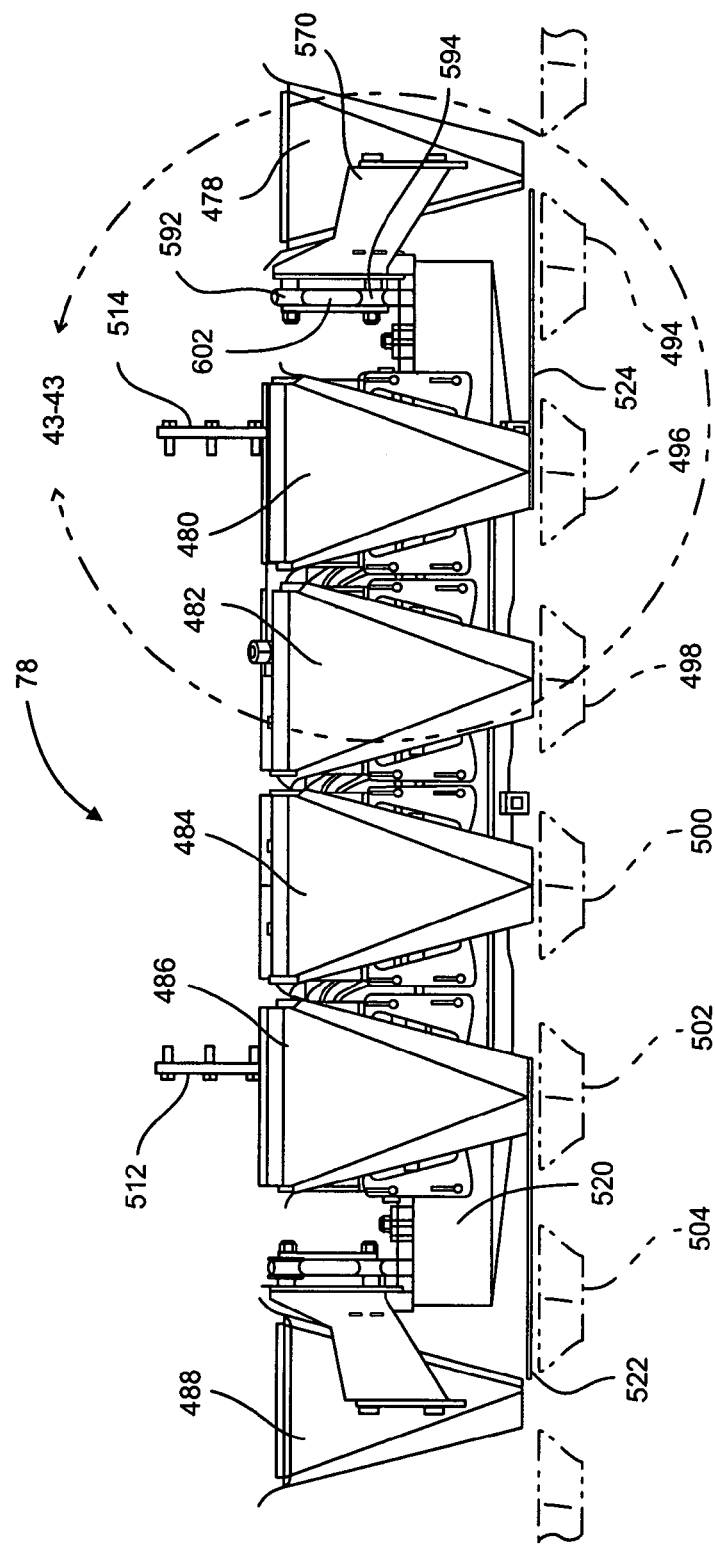
FIG. 32 is an elevation view of the funnel group shown in FIGS. 29 and 31 and, in phantom lines, the target containers.
Figure 33:
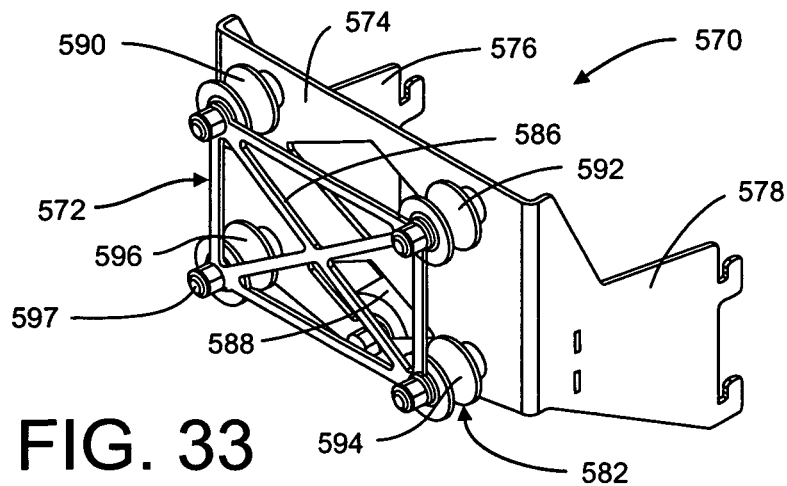
FIG. 33 is an enlarged rear isometric view of a portion of a funnel bracket of the funnel group shown in FIGS. 29, 31 and 32.
Figure 34:
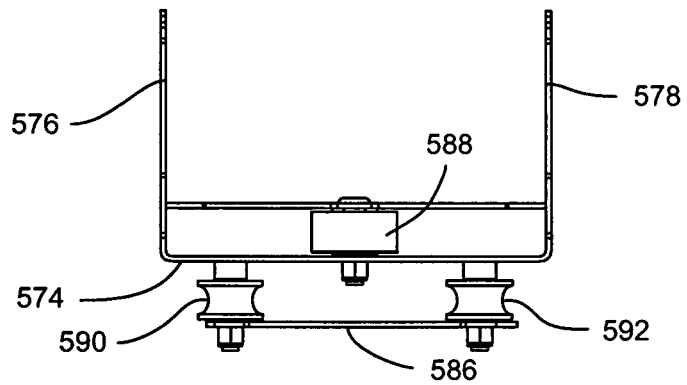
FIG. 34 is a plan view of the funnel bracket portion shown in FIG. 33.
Figure 35:
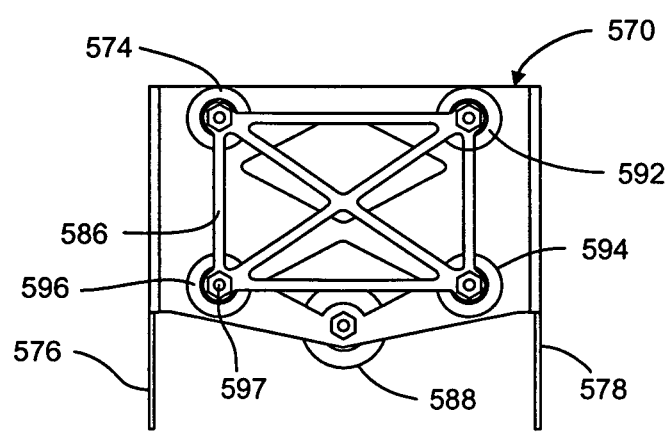
FIG. 35 is a rear elevation view of the funnel bracket portion shown in FIGS. 33 and 34.

To elaborate on the vertical movement of the dispensing funnels, reference is made to FIGS. 29, 32 and 43. The positions of the dispensing funnels 478, 480, 482 connected to the funnel brackets 570, 672, 674, respectively, are shown in three different vertical positions. The dispensing funnel 482 is located closest to the target container 498 as the dispensing funnel travels in synchronization with the target container on the recessed front portion 556 of the guide pan 520. The next dispensing funnel 480, to the right of the dispensing funnel 482, is at the transition portion 682, FIGS. 42 and 43, of the top rim 554 and is positioned to clear the cover panel 524 which protects the target container 494 to prevent any product that may have clung to the dispensing funnel from the previous deposit from landing on the periphery of the target container. In the same way, the cover panel 522 protects the target container 504 from product that may have clung to the dispensing funnel 448. The next dispensing funnel 478, to the right of the dispensing funnel 480 is located on the curved portion of the racetrack configured rail and is at the highest vertical position because the dispensing funnel 478 is moving along the upper portion 678 of the top rim 554.

During dispensing of product beginning toward the right end of the racetrack configured rail, the movable upper funnel 74 directs product coming off the receiving conveyor assembly 70 when the dispensing funnel is in the position shown by the dispensing funnel 480 during which time the dispensing funnel is on the transition portion 682 dropping downward toward the target container 496. A cutback 684, FIG. 29, in the cover panel 524 enables the product to be directed by the upper funnel 74 into and through the dispensing funnel 480 and the product begins being deposited into the target container 496. Once the dispensing funnel moves forward to the position shown by the dispensing funnel 482 the dispensing funnel has been lowered by moving on the recessed front portion 556 of the guide pan 520 enabling the product in the dispensing funnel to drop into the target container 498 in a precisely controlled manner to ensure product does not drop on the periphery of the target container 498. Dispensing may continue to the next leftward position, where the dispensing funnel 484 is located, because the dispensing funnel 484 is still on the recessed front portion 556 and is unblocked by either of the cover panels 522, 524. The dispensing funnel is still unblocked when in the next position where the dispensing funnel 486 is located because of a second cutout 686, FIG. 29, in the cover panel 522. The relatively long dwell time during which the dispensing funnels are moving in synchronization over the target containers translates into the advantage of faster conveyor speeds and increased production, in addition to the feature of precise deposits.

It is noted that throughout the present specification, words such as "forward", "rearward", "upper", "lower", "top", "bottom", "front", "rear", "above", "below", "upstream" and "downstream", as well as like terms, refer to portions of the dispensing apparatus as they are viewed in the drawings relative to other portions or in relationship to the position of the apparatus as it will typically be situated during operation. It should also be noted that the various structures described above, which have been grouped as part of assemblies, could be treated individually without regard to an "assembly", or the structures may be grouped in smaller assemblies or sub-assemblies. The use of assemblies here is strictly for convenience and for clarity.

Assuming that shredded cheese of the type used on pizza is the product to be handled and dispensed and for which the preferred embodiment disclosed here was designed, and that the targets are flatten pizza dough, aligned two abreast, the operation of the dispensing apparatus begins by the delivery of the product to be dispensed to the dispensing apparatus 60, such as by the delivery conveyor 40. The shredded cheese is deposited from the delivery conveyor onto the intake conveyor 66 where the cheese is transported to a position above the hoppers of the receiving conveyor assemblies 68, 70, such as the hopper 362. The receiving conveyor assemblies 68, 70 transport the cheese product at varying speeds passed the rake assemblies 72, 73 where the cheese is loosened, spread and leveled to a predetermined height before being dropped through the upper funnels 74, 75. The metered cheese continues through the upper funnels and into the dispensing funnels of the funnel groups 76, 78. When the dispensing funnels are traveling over the cover panels 522, 524 the normally open funnel bottoms, such as the open bottom 634 of the dispensing funnel 478, are blocked.

When the moving dispensing funnels reach the recessed front portion 556 of the guide pan 520, the funnels are lowered toward the targets and move beyond the cover panels. Because the open bottoms of the dispensing funnels become unblocked, the cheese in each dispensing funnel is free to flow out onto a respective pizza dough target. Because the dispensing funnels are located just above the dough and moving with the dough in synchronization, the cheese drops in a precise pattern to ensure that no cheese is deposited on the peripheries of the dough, an important feature of the dispensing apparatus of the present invention. Another feature is that the dispensing funnels are moving in a racetrack pattern with a relatively long linear run in conjunction with a dough target on the target conveyor system enabling a relatively long dwell time over the dough. The extended dwell time ensures that the cheese is able to pass out of the dispensing funnels unto the dough, and enables the whole dispensing process to move very rapidly, another important advantage of the dispensing apparatus 60 for an assembly line operation.

It is noted that the dispensing apparatus 60 is extremely flexible in that a number of adjustments may be made to accommodate existing assembly line structures. For example, when the delivery conveyor 40 is used, it may be wheeled to any location where the upper end of the delivery conveyor is above the intake conveyor. The dispensing apparatus itself may also be wheeled into a desired location and then adjusted, another important feature when the dispensing apparatus is retrofitted to an existing target conveyor system. Adding to the features of the dispensing apparatus is that the head assembly 64 may be adjusted vertically. Yet another advantage is that the intake conveyor may be adjusted horizontally to accommodate an existing delivery system or the delivery conveyor. Still another feature is that the rake assemblies and the conveyor velocities may be adjusted as desired, and the upper funnels still enable containment and redirection.

The receiving conveyor assemblies 68, 70 may be adjusted to align the conveyor belts relative to respective drive rollers, and the fine tension in the conveyor belts may be adjusted as the belts age. A quick release of each conveyor belt is also provided for cleaning and maintenance. The rake assemblies 72, 73 are vertically adjustable so that the product to be dispensed may be controlled and metered. The funnel groups 76, 78 are adjustable so that the velocity of the dispensing funnels may match the velocity of the targets on the target conveyor system. And, the dispensing funnels are exchangeable by being easily removed from the funnel brackets and replaced with dispensing funnels of different shapes and/or designs. Even the guide pan may be exchanged to increase or lessen the amount of recess in the front portion.

Figure 44:
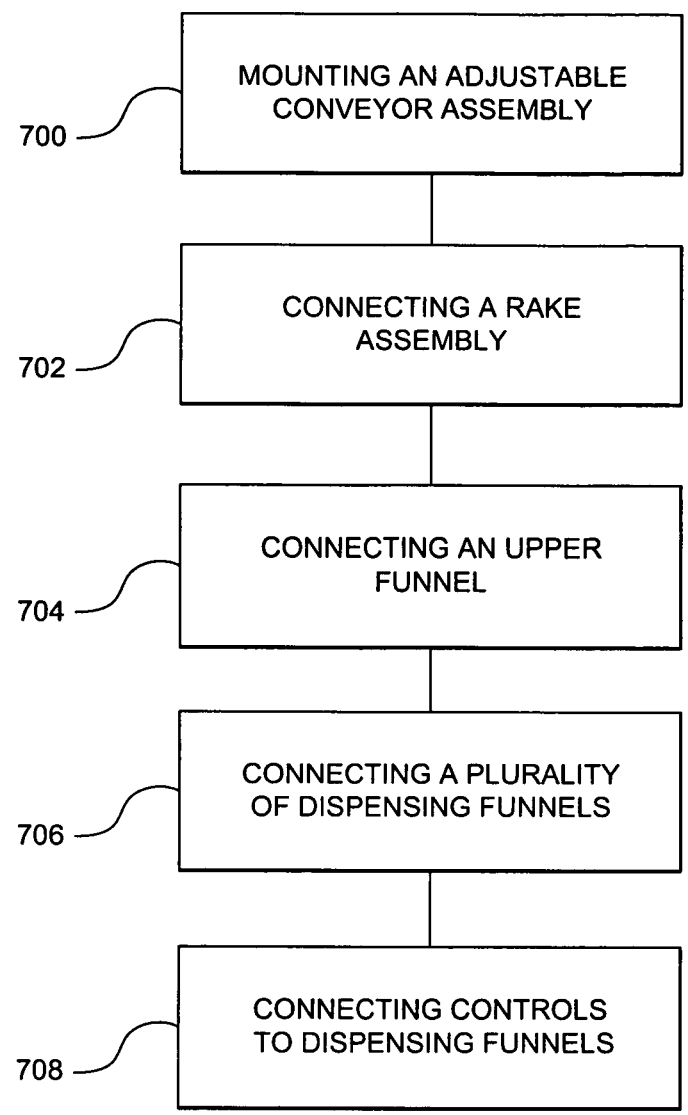
FIG. 44 is a flow diagram of a method for making the dispensing apparatus.

The present invention also includes a method for making a dispensing apparatus, such as the dispensing apparatus 60, the steps of the method including mounting 700, FIG. 44, an adjustable receiving conveyor assembly, such as the receiving conveyor assembly 70, to a frame, connecting 702 a rake assembly, such as the rake assembly 72, to the frame above the rake conveyor assembly, connecting 704 an upper funnel, such as the upper funnel 74, to the frame at a downstream end of the receiving conveyor assembly to pass raked product to be dispensed, connecting 706 a plurality of dispensing funnels, such as the dispensing funnels of the funnel group 78, to the frame below the upper funnel, the dispensing funnels being arranged to move along a rail with a racetrack configuration wherein a linear portion of the racetrack configured rail is located to enable the dispensing funnels to move above a linear portion of a conveyor system, such as the conveyor system 490, transporting targets to receive product to be dispensed, and connecting 708 controls, such as those found in the electrical/electronics cabinet 80 and in the control box 84, to the dispensing funnels to enable movement of the plurality of dispensing funnels in synchronization with the movement of the targets on the target transporting conveyor system.

It is now appreciated that the dispensing apparatus disclosed in detail above is compact, structurally robust, adjustable in multiple ways to enable easy retrofitting to an existing assembly line conveyor systems, and fast and precise in operation.

From the foregoing, it can be seen that there has been provided features for an improved dispensing apparatus and a disclosure for the method of the making the apparatus. While a particular embodiment of the present invention have been shown and described in detail, it will be obvious to those skilled in the art that changes and modifications may be made without departing from the invention in its broader aspects. Therefore, the aim is to cover all such changes and modifications as fall within the true spirit and scope of the invention. The matters set forth in the foregoing description and accompanying drawings are offered by way of illustrations only and not as limitations. The actual scope of the invention is defined by the subsequent Claims immediately following when viewed in their proper perspective based on the prior art.

What is claimed is:

1. A dispensing apparatus comprising:
a base; and
a head assembly adjustably mounted to the base and structured to accommodate a linear portion of a target transporting conveyor system, the head assembly including a product receiving conveyor assembly for transporting product to be dispensed, an adjustable rake assembly for metering the product to be dispensed, and a racetrack configured funnel group mounted below the product receiving conveyor assembly, the funnel group including a plurality of dispensing funnels where the dispensing funnels are enabled to move continually along the racetrack configuration, and wherein during dispensing a portion of the plurality of the dispensing funnels is aligned with the targets on the linear portion of the target transporting conveyor system, and the plurality of dispensing funnels are enabled to continually move above, parallel to, and in synchronization with continually moving targets on the linear portion of the target transporting conveyor system.

2. The dispensing apparatus of claim 1, wherein:
the head assembly includes an upper funnel adjustably mounted at a downstream end of the product receiving conveyor assembly for containment and redirection of raked product to the plurality of dispensing funnels of the funnel group.

3. The dispensing apparatus of claim 1, including:
a cover panel for blocking open bottoms of selected dispensing funnels.

4. The dispensing apparatus of claim 1, including:
an intake conveyor assembly mounted to the head assembly, the intake conveyor assembly being horizontally adjustable.

5. The dispensing apparatus of claim 1, including:
a guide structure to enable moving dispensing funnels to move closer to moving targets on the transporting conveyor system.

6. The dispensing apparatus of claim 1, including:
an upper funnel mounted to the head assembly at a downstream end of the product conveyor assembly for containment and redirection of raked product to the dispensing funnels of the funnel group; and
a cover panel for blocking open bottoms of selected dispensing funnels.

7. The dispensing apparatus of claim 6, including:
a guide structure to enable moving dispensing funnels to move closer to moving targets on the transporting conveyor system.

8. The dispensing apparatus of claim 7, including:
an intake conveyor assembly mounted to the head assembly, the intake conveyor assembly being horizontally adjustable.

9. The dispensing apparatus of claim 1, including:
an intake conveyor assembly mounted to the head assembly, the intake conveyor assembly being horizontally adjustable; and
a guide structure to enable moving dispensing funnels to move closer to moving targets on the transporting conveyor system.

10. A dispensing apparatus comprising:
a base, the base including a rack;
a head assembly adjustably mounted to the base and structured to accommodate a linear portion of a conveyor system transporting targets for receiving product dispensed from the head assembly, the head assembly being vertically adjustable relative to the base;
the head assembly including a product receiving conveyor assembly for transporting product to be dispensed, an adjustable rake assembly for metering the product to be dispensed on the product receiving conveyor assembly, and a racetrack configured funnel group mounted below the product receiving conveyor assembly, and the head assembly includes a pawl for engaging the rack; and the funnel group including a plurality of dispensing funnels having open tops and bottoms wherein the dispensing funnels are able to move linearly above and in synchronization with targets on the linear portion of the target transporting conveyor system.

11. The dispensing apparatus of claim 10, including:
a safety enclosure mounted to the head assembly.

12. The dispensing apparatus of claim 10, wherein:
the product receiving conveyor assembly includes a pair of brackets, each of the brackets having holes, a motor connected to the brackets, a gear set connected to the motor, a drive plug mounted to the gear set, a conveyor roller having a drive hub for receiving the drive plug, a conveyor belt mounted to the conveyor roller, and a bearing post connected to the motor and the gear set, the bearing post having two curved portions for mounting in the holes of the brackets.

13. The dispensing apparatus of claim 12 including:
a handle assembly connected to the brackets of the product receiving conveyor assembly to reduce tension in the conveyor belt.

14. The dispensing apparatus of claim 13 including:
a pivot link connected to each of the brackets of the product receiving conveyor assembly to enable fine tension adjustment of the conveyor belt.

15. The dispensing apparatus of claim 14, including:
an upper funnel mounted at a downstream end of the product receiving conveyor assembly for containing and redirecting raked product to the dispensing funnels of the funnel group; and
a cover panel for blocking open bottoms of selected dispensing funnels.

16. The dispensing apparatus of claim 15, including:
a guide structure to enable the dispensing funnels to move closer to targets on the transporting conveyor system; and
a safety enclosure mounted to the head assembly.

17. A dispensing apparatus comprising:
a base; and
a head assembly mounted to the base, the head assembly including a product receiving conveyor assembly, an adjustable rake assembly mounted above the product receiving conveyor assembly, and a racetrack configured funnel group mounted below the product receiving conveyor assembly and above a linear portion of a target transporting conveyor system enabled to move continually, wherein during dispensing the racetrack configured funnel group is disposed to have funnels of the funnel group move continually above, parallel to and in synchronization with moving targets on a linear portion of the target transporting conveyor system.

18. The dispensing apparatus of claim 17, including:
an upper funnel mounted adjustably to the head assembly at a downstream end of the product receiving conveyor assembly for directing raked product to the dispensing funnels of the funnel group;
a cover panel for blocking open bottoms of selected dispensing funnels;
an intake conveyor assembly mounted to the head assembly above the product receiving conveyor assembly, the intake conveyor assembly being horizontally adjustable; and
a guide structure to enable moving dispensing funnels to move closer to moving targets on the target transporting conveyor system.

19. The dispensing assembly of claim 17 wherein:
the head assembly includes an adjustable upper funnel mounted above the funnel group at an end of the product receiving conveyor assembly for directing raked product to the dispensing funnels of the funnel group as the dispensing funnels move along the racetrack configuration and the targets move on the target transporting conveyor system.

20. The dispensing assembly of claim 17 wherein:
the head assembly includes a frame for compactly mounting the product receiving conveyor assembly, the rake assembly, the racetrack configured funnel group, a cover panel and a guide structure; and
the base includes a set of wheels.

21. A method for making a dispensing apparatus, the steps of the method comprising:
mounting a frame to a base;
mounting a product receiving conveyor to the frame;
mounting a rake assembly to the frame above the product receiving conveyor;
connecting an adjustable funnel to the frame at a downstream end of the product receiving conveyor to direct product falling from the downstream end of the product receiving conveyor;
mounting a racetrack configured funnel group to the frame, the funnel group having a plurality of funnels enabled to move continually;
mounting a stationary cover panel to the frame below a portion of the racetrack configured funnel group to block selectively open bottoms of the plurality of funnels;
mounting a racetrack configured guide structure to the frame for operatively engaging the plurality of funnels of the funnel group to enable the plurality of funnels to move continually along the guide structure to pass under the adjustable funnel for receiving product and to pass along a linear portion of the racetrack configured guide structure for enabling the plurality of funnels to move above and parallel to a linear portion of a conveyor system transporting product receiving targets and in synchronization with continually moving targets; and
controls mounted to the frame to enable synchronization of continual movements of the product receiving conveyor, the plurality of funnels and the transporting conveyor system supporting and moving the targets.

* * * * *